US011516126B2

(12) United States Patent
Tracy et al.

(10) Patent No.: US 11,516,126 B2
(45) Date of Patent: Nov. 29, 2022

(54) TECHNIQUES FOR HIGH PERFORMANT VIRTUAL ROUTING CAPABILITIES

(71) Applicant: Oracle International Corporation, Redwood Shores, CA (US)

(72) Inventors: Leonard Thomas Tracy, Bothell, WA (US); Lucas Michael Kreger-Stickles, Seattle, WA (US); Andrey Yurovsky, Seattle, WA (US); Philip James Ramsey, Bainbridge Island, WA (US); Shane Baker, Kenmore, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/175,573

(22) Filed: Feb. 12, 2021

(65) Prior Publication Data
US 2022/0116323 A1    Apr. 14, 2022

Related U.S. Application Data

(60) Provisional application No. 63/131,699, filed on Dec. 29, 2020, provisional application No. 63/091,859, filed on Oct. 14, 2020.

(51) Int. Cl.
*H04L 45/586* (2022.01)
*H04L 45/00* (2022.01)
(Continued)

(52) U.S. Cl.
CPC ........ *H04L 45/586* (2013.01); *G06F 9/45558* (2013.01); *H04L 45/20* (2013.01); *H04L 45/22* (2013.01); *H04L 45/24* (2013.01); *H04L 45/42* (2013.01); *H04L 45/566* (2013.01); *H04L 45/74* (2013.01); *G06F 2009/45595* (2013.01)

(58) Field of Classification Search
CPC ....... H04L 45/20; H04L 45/24; H04L 45/566; H04L 45/586; G06F 9/45558; G06F 2009/45595
See application file for complete search history.

(56) References Cited

U.S. PATENT DOCUMENTS 7,738,457 B2 * 6/2010 Nordmark ............... H04L 49/30
370/409
10,785,158 B1   9/2020 Chen et al.
(Continued)

FOREIGN PATENT DOCUMENTS

EP           3806409 A1    4/2021

OTHER PUBLICATIONS

Luo, Yan, Eric Murray, and Timothy L. Ficarra. "Accelerated virtual switching with programmable NICs for scalable data center networking." Proceedings of the second ACM SIGCOMM workshop on Virtualized infrastructure systems and architectures. (Year: 2010).*
(Continued)

*Primary Examiner* — John M MacIlwinen
(74) *Attorney, Agent, or Firm* — Kilpatrick Townsend & Stockton LLP

(57) ABSTRACT

Techniques are disclosed for providing high performant packets processing capabilities in a virtualized cloud environment that enhance the scalability and high availability of the packets processing infrastructure. In certain embodiments disclosed herein, the VNICs functionality performed by network virtualization devices (NVDs) is offloaded from the NVDs to a fleet of computers, referred to as VNIC-as-a-Service System (or VNICaaS system). VNICaaS system is configured to provide Virtual Network Interface Cards (VNICs)-related functionality or service for multiple compute instances belonging to multiple tenants or customers of the CSPI. The VNICaaS system is capable of hosting multiple VNICs to process and transmit traffic in a distributed virtualized cloud networks environment. A single VNIC executed by the VNICaaS system can be used to process packets received from multiple compute instances.

20 Claims, 20 Drawing Sheets

(51) Int. Cl.
  *G06F 9/455*  (2018.01)
  *H04L 45/24*  (2022.01)
  *H04L 45/42*  (2022.01)
  *H04L 45/74*  (2022.01)

(56) References Cited

U.S. PATENT DOCUMENTS

| | | | |
|---|---|---|---|
| 2009/0238189 | A1 | 9/2009 | Tripathi et al. |
| 2018/0006877 | A1 | 1/2018 | Raman et al. |
| 2018/0212875 | A1 | 7/2018 | Zhu |
| 2019/0097838 | A1* | 3/2019 | Sahoo ............... H04L 12/4625 |
| 2019/0173780 | A1 | 6/2019 | Hira et al. |
| 2019/0179668 | A1* | 6/2019 | Wang ................... G06F 9/4881 |
| 2020/0314015 | A1 | 10/2020 | Mariappan et al. |
| 2020/0334242 | A1 | 10/2020 | Muralidhar et al. |
| 2020/0382471 | A1 | 12/2020 | Janakiraman et al. |
| 2021/0119921 | A1* | 4/2021 | Xie ...................... H04L 47/125 |
| 2021/0385149 | A1* | 12/2021 | Suryanarayana ..... H04L 45/586 |

OTHER PUBLICATIONS

Firestone, Daniel, et al. "Azure Accelerated Networking:{SmartNICs} in the Public Cloud." 15th USENIX Symposium on Networked Systems Design and Implementation (NSDI 18). (Year: 2018).*

Wang, Peng, et al. "Expeditus: Congestion-aware load balancing in clos data center networks." IEEE/ACM Transactions on Networking 25.5: 3175-3188. (Year: 2017).*

Liebeherr, Jörg, and Majid Valipour. "Experimental Evaluation of Address Binding Dissemination in Multi-substrate Overlay Networks." (Year: 2011).*

Bari, Md Faizul, et al. "Data center network virtualization: A survey." IEEE communications surveys & tutorials 15.2: 909-928. (Year: 2012).*

Eisenbud, Daniel E., et al. "Maglev: A fast and reliable software network load balancer." 13th USENIX Symposium on Networked Systems Design and Implementation (NSDI 16). (Year: 2016).*

Li et al., *A Novel Hardware-Assisted Virtualization Approach for Network Interface Card*, International Conference on Research Challenges in Computer Science, Dec. 2009, pp. 225-228.

U.S. Appl. No. 17/175,569, Non-Final Office Action dated Sep. 27, 2021, 21 pages.

U.S. Appl. No. 17/515,087, Non-Final Office Action dated Mar. 24, 2022, 10 pages.

U.S. Appl. No. 17/175,569, Final Office Action dated Apr. 15, 2022, 22 pages.

U.S. Appl. No. 17/515,093, Non-Final Office Action dated May 25, 2022, 21 pages.

U.S. Appl. No. 17/175,569 , Advisory Action, dated Aug. 4, 2022, 6 pages.

* cited by examiner

FIG. 11A

| SRC: MICRO VNIC OVERLAY IP | DEST: PE VNIC IP | PROTO: TCP | SRC PORT CLIENT PORT | DEST PORT SERVICE PORT |
|---|---|---|---|---|

↙ FORWARD PACKET

FIG. 11B

| SRC: CLIENT SUBSTRATE | DST: VNICAAS ANYCAST | MPLS CLIENT VNIC | MPLS PE VNIC | SRC: MICRO VNIC OVERLAY IP | DEST: PE VNIC IP | PROTO: TCP | SRC PORT CLIENT PORT | DEST PORT SERVICE PORT |
|---|---|---|---|---|---|---|---|---|

FIG. 11C

| SRC: VNICAAS ANYCAST | DST: PE ANYCAST | MPLS PE VNIC | MPLS PE LABEL | SRC: MICRO VNIC OVERLAY IP | DEST: PE VNIC IP | PROTO: TCP | SRC PORT CLIENT PORT | DEST PORT SERVICE PORT |
|---|---|---|---|---|---|---|---|---|

RESPONSE PACKET

| SRC: PE ANYCAST | DST: VNICAAS ANYCAST | MPLS PE LABEL | MPLS PE VNIC | SRC: PE VNIC IP | DEST. INS OVERLAY IP | PROTO: TCP | SRC PORT SERVICE PORT | DEST PORT CLIENT PORT |
|---|---|---|---|---|---|---|---|---|

*FIG. 12A*

| SRC: VNICAAS ANYCAST | DST: CLIENT SUBSTRATE | MPLS PE VNIC | MPLS CLIENT VNIC | SRC: PE VNIC IP | DEST. INS OVERLAY IP | PROTO: TCP | SRC PORT SERVICE PORT | DEST PORT CLIENT PORT |
|---|---|---|---|---|---|---|---|---|

*FIG. 12B*

| SRC: PE VNIC IP | DEST. INS OVERLAY IP | PROTO: TCP | SRC PORT SERVICE PORT | DEST PORT CLIENT PORT |
|---|---|---|---|---|

*FIG. 12C*

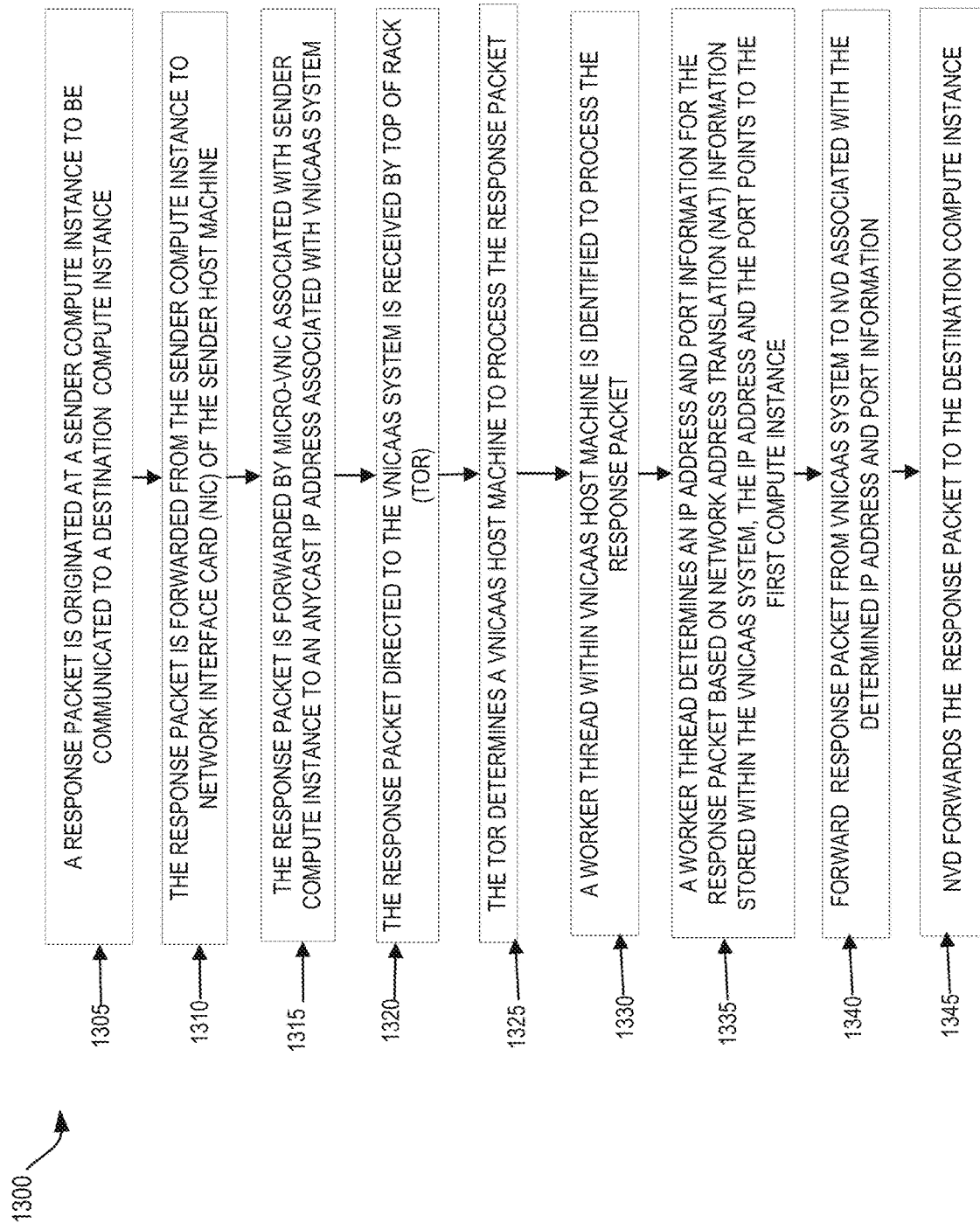

TECHNIQUES FOR HIGH PERFORMANT VIRTUAL ROUTING CAPABILITIES

CROSS-REFERENCES TO RELATED APPLICATIONS

This application is a non-provisional of and claims the benefit of the filing date of the following provisional applications: (1) U.S. Provisional Application No. 63/131,699, filed on Dec. 29, 2020, and (2) U.S. Provisional Application No. 63/091,859, filed on Oct. 14, 2020. The above-referenced provisional applications are incorporated herein by reference in their entirety for all purposes.

BACKGROUND

The demand for cloud-based services continues to increase rapidly. The term cloud service is generally used to refer to a service that is made available to users or customers on demand (e.g., via a subscription model) using systems and infrastructure (cloud infrastructure) provided by a cloud services provider. Typically, the servers and systems that make up the cloud service provider's infrastructure are separate from the customer's own on-premise servers and systems. Customers can thus avail themselves of cloud services provided by a cloud service provider without having to purchase separate hardware and software resources for the services. There are various different types of cloud services including Software-as-a-Service (SaaS), Platform-as-a-Service (PaaS), Infrastructure-as-a-Service (IaaS), and others.

To utilize cloud services, network traffic between a customer and a cloud services provider is processed and transported over network virtualization device(s). Specifically, communication between customers' and service provider's virtual networks is handled by a virtual interface hosted on the network virtualization device. The virtual interface provides virtual networking for a physical networking resource (e.g., Network Interface Card (NIC)) to enable an ability to access, connect, secure, and modify cloud resources. Typically, a network virtualization device is attached to a computing instance (e.g., a cloud based workstation) within a virtual network, and a virtual interface, Virtual Network Interface Card (VNIC), hosted on the network virtualization device manages communications of the computing instance within and outside the virtual network. The VNIC attached to the computing instance isn't horizontally scalable or highly available due to bandwidth and processing limitations of the underlying network virtualization device. Accordingly, the VNIC isn't scalable for efficiently processing a large volume of network traffic nor capable of processing traffic for multiple computing instances within the same or different virtual networks. Building a high performant, scalable, and highly available infrastructure to process network traffic is a complex and time-consuming task, especially when the infrastructure has to scale across multiple instances within one or more virtual networks.

SUMMARY

The present disclosure relates generally to techniques for providing high performant virtual routing capabilities, and more particularly providing scalability and high availability for processing network traffic. Various embodiments are described herein, including methods, systems, non-transitory computer-readable storage media storing programs, code, or instructions executable by one or more processors, and the like.

The disclosure relates to providing a technique for independently processing network traffic on a scalable and highly available distributed network infrastructure or a system defined as a VNIC as a Service or VNICaaS system. An aspect of the present disclosure provides for a method including: receiving, by a first host machine of a packet processing system comprising a plurality of host machines, a first packet originating from a first compute instance hosted by a source host machine that is different from the plurality of host machines, the packet processing system being configured to provide functionality of a plurality of virtual network interface cards (VNICs), wherein the first compute instance is part of a first virtual cloud network (VCN); identifying, by the first host machine and from a plurality of worker threads executed by the first host machine, a first worker thread for processing the first packet; identifying, by the first worker thread and based upon information included in the first packet, a first VNIC from the plurality of VNICs to be used for processing the first packet; determining, by the first worker thread and based upon information associated with the first VNIC and destination information included in the first packet, a first next-hop target to which the first packet is to be forwarded; and causing, by the first worker thread, the first packet to be forwarded to the first next-hop target to be forwarded to a first destination.

Another aspect of the present disclosure provides for a computer system, comprising: one or more processors, and a non-transitory computer-readable storage medium containing instructions which, when executed on the one or more processors, cause the one or more processors to perform operations including: receiving, by a first host machine of a packet processing system comprising a plurality of host machines, a first packet originating from a first compute instance hosted by a source host machine that is different from the plurality of host machines, the packet processing system being configured to provide functionality of a plurality of virtual network interface cards (VNICs), wherein the first compute instance is part of a first virtual cloud network (VCN); identifying, by the first host machine and from a plurality of worker threads executed by the first host machine, a first worker thread for processing the first packet; identifying, by the first worker thread and based upon information included in the first packet, a first VNIC from the plurality of VNICs to be used for processing the first packet; determining, by the first worker thread and based upon information associated with the first VNIC and destination information included in the first packet, a first next-hop target to which the first packet is to be forwarded; and causing, by the first worker thread, the first packet to be forwarded to the first next-hop target to be forwarded to a first destination.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there. For the sake of brevity any mention of "VNICaaS" or "system" later in this disclosure refers specifically to a VNICaaS system, any mention of "service network" or "provider network" later in this disclosure refers specifically to "service provider's virtual cloud network," and any mention of "customer network" or "customer virtual network" later in this disclosure refers specifically to "customer VCN."

BRIEF DESCRIPTION OF THE DRAWINGS

Features, embodiments, and advantages of the present disclosure are better understood when the following Detailed Description is read with reference to the accompanying drawings.

FIGS. 11A-11C depict an example of encapsulation techniques that are used to communicate a network packet from a customer's compute instance to a VNICaaS system according to certain embodiments.

FIGS. 12A-12C depict an example of encapsulation performed for a response packet to be communicated from a service compute instance to a customer's compute instance according to certain embodiments.

FIG. 13 depicts a simplified flowchart depicting processing performed for communicating a response packet using a VNICaaS system according to certain embodiments.

DETAILED DESCRIPTION

Figure 1:
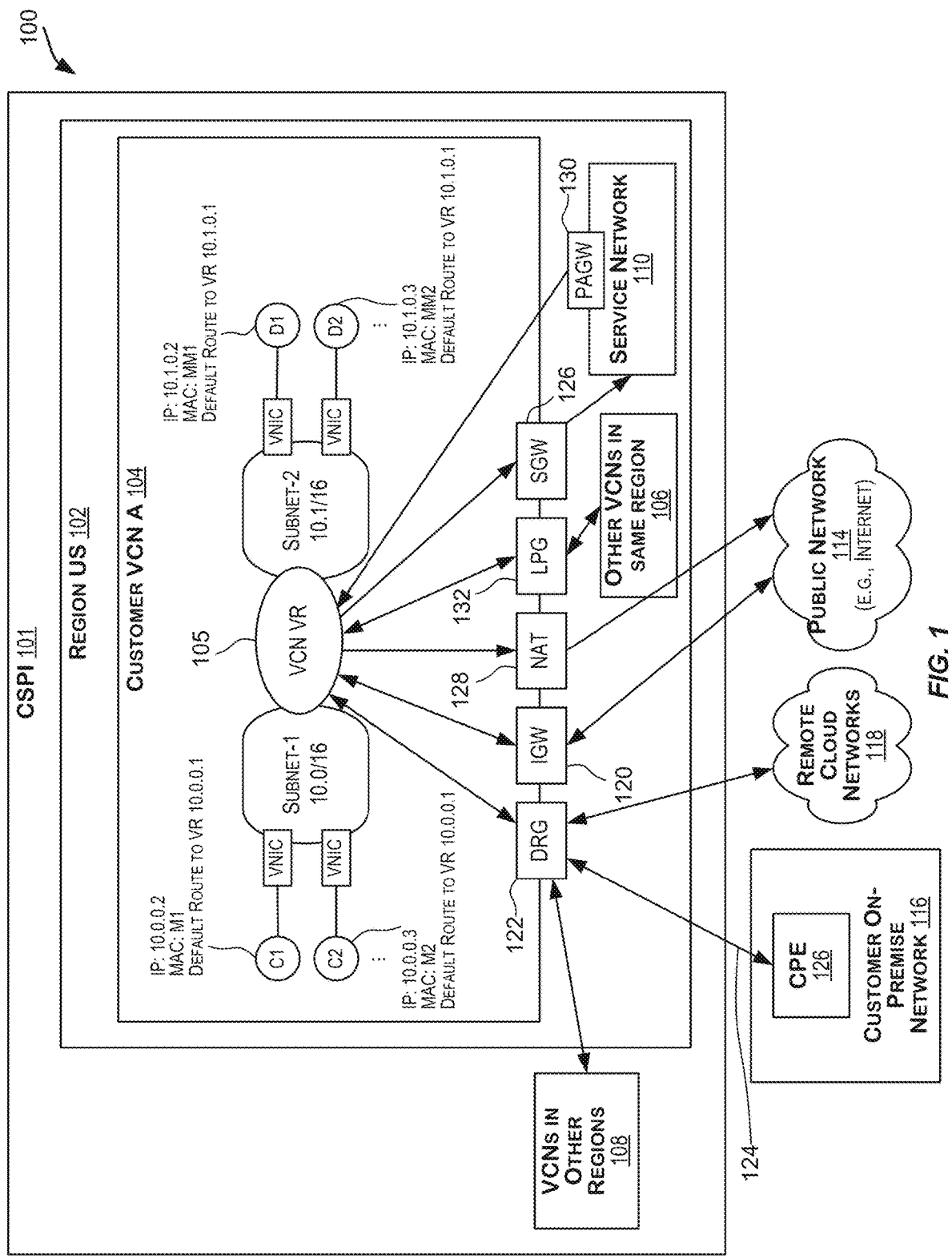
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In an Infrastructure-as-a-Service (IaaS) model, a cloud service provider (CSP) provides infrastructure (referred to as cloud services provider infrastructure or CSPI) that can be used to build one or more overlay networks, also referred to as virtual cloud networks (VCNs). The CSPI includes compute, memory, and networking resources that provide the underlying basis for creating one or more overlay or virtual cloud networks. Customers of CSPI can build their own virtual cloud networks (VCNs) using compute, memory, and networking resources provided by CSPI. A customer can deploy customer resources or workloads, such as compute instances, on these customer VCNs. Compute instances can take the form of virtual machines, bare metal instances, and the like. These compute instances may represent various customer workloads such as applications, load balancers, databases, and the like.

A compute instance participates in a VCN via a virtual network interface card (VNIC) that is configured for and associated or attached to the compute instance. A VNIC is a logical representation of a physical Network Interface Card (NIC). A VNIC provides an interface between an entity (e.g., a compute instance, a service) and a virtual network. A VNIC has one or more associated IP addresses. A VNIC associated with a compute instance enables the compute instance to be a part of a VCN and enables the compute instance to communicate (e.g., send and receive packets) with endpoints that are in the same VCN and/or with endpoints outside the VCN to which the compute instance belongs.

Compute instances may be hosted by host machines. For a compute instance hosted by a host machine, the VNIC functionality corresponding to the VNIC configured for that compute instance is executed by a network virtualization device (NVD), which is a physical device connected to the host machine. An NVD is configured to implement various network virtualization functions to facilitate communication of packets to and from the compute instances. In certain embodiments, upon receiving a packet, an NVD is configured to execute a packet processing pipeline for processing the packet and determining how the packet is to be forwarded or routed, including encapsulation/decapsulation of packets, providing the VNIC functionality, etc.

In specific architectures, for multiple compute instances hosted by a host machine, the VNICs corresponding to the compute instances are executed by the NVD connected to the host machine. Since the processing and memory resources provided by an NVD are fixed, there is a limit on the number of VNICs that can be supported by an NVD, which in turn limits the number of compute instances hosted by a host machine. Further, as the number of VNICs executed by an NVD increases, it constrains the bandwidth and resources available for each of the VNICs and thus the bandwidth and resources available for processing packets originating from and received by the compute instances hosted by the host machine. This limits the scalability of the architecture and limits it to the underlying physical NVD resources.

The present disclosure describes a new highly available and scalable architecture for providing VNICs-related functionality. In certain implementations, a portion of the VNICs functionality previously provided by the NVDs is offloaded from the NVDs and provided instead by a centralized system whose resources (e.g., computer, memory, and networking resources) can be scaled as desired. In this architecture, the centralized system can host and execute VNICs for multiple compute instances belonging to one or multiple customers or tenants of the CSPI. The centralized system comprises a fleet of computers that are configured to execute multiple VNICs and is a horizontally scalable. In certain implementations, the functionality provided by the system is offered as a service and the centralized system is thus referred to as VNIC-as-a-Service system or VNICaaS system.

The present disclosure describes techniques for providing high performant packets processing capabilities in a virtualized cloud environment that enhance the scalability and high availability of the packets processing infrastructure. In certain embodiments disclosed herein, the VNICs functionality performed by the NVDs is offloaded from the NVDs to a fleet of computers, referred to as VNIC-as-a-Service System (or VNICaaS system) that is configured to provide VNICs-related functionality or service for multiple compute instances belonging to multiple tenants or customers of the CSPI. In certain implementations, a single VNIC executed by the VNICaaS system can be used to process packets received from multiple compute instances. This is different from other architectures where there is a one-to one correspondence between a compute instance and a VNIC. A VNIC hosted by VNICaaS system can also be associated with multiple VNICs corresponding to compute instances. Where these multiple compute instances are the intended destination endpoints of a packet processed by the VNICaaS system, one of the multiple destination endpoints may be selected by VNICaaS system for receiving the packet. The functionalities provided by VNICaaS system thus enable VNICs and associated packet processing to be scaled and made highly available for multiple compute instances from multiple tenants.

Example Architecture of Cloud Infrastructure

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by physical devices such as network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC) that enables the compute instance to participate in a subnet of a VCN. A VNIC is a logical representation of physical Network Interface Card (NIC). In general, a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 16, 17, 18, and 19 (see references 1616, 1716, 1816, and 1916) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 16, 17, 18, and 19 are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 16, 17, 18, and 19 (for example, gateways referenced by reference numbers 1634, 1636, 1638, 1734, 1736, 1738, 1834, 1836, 1838, 1934, 1936, and 1938) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 1120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
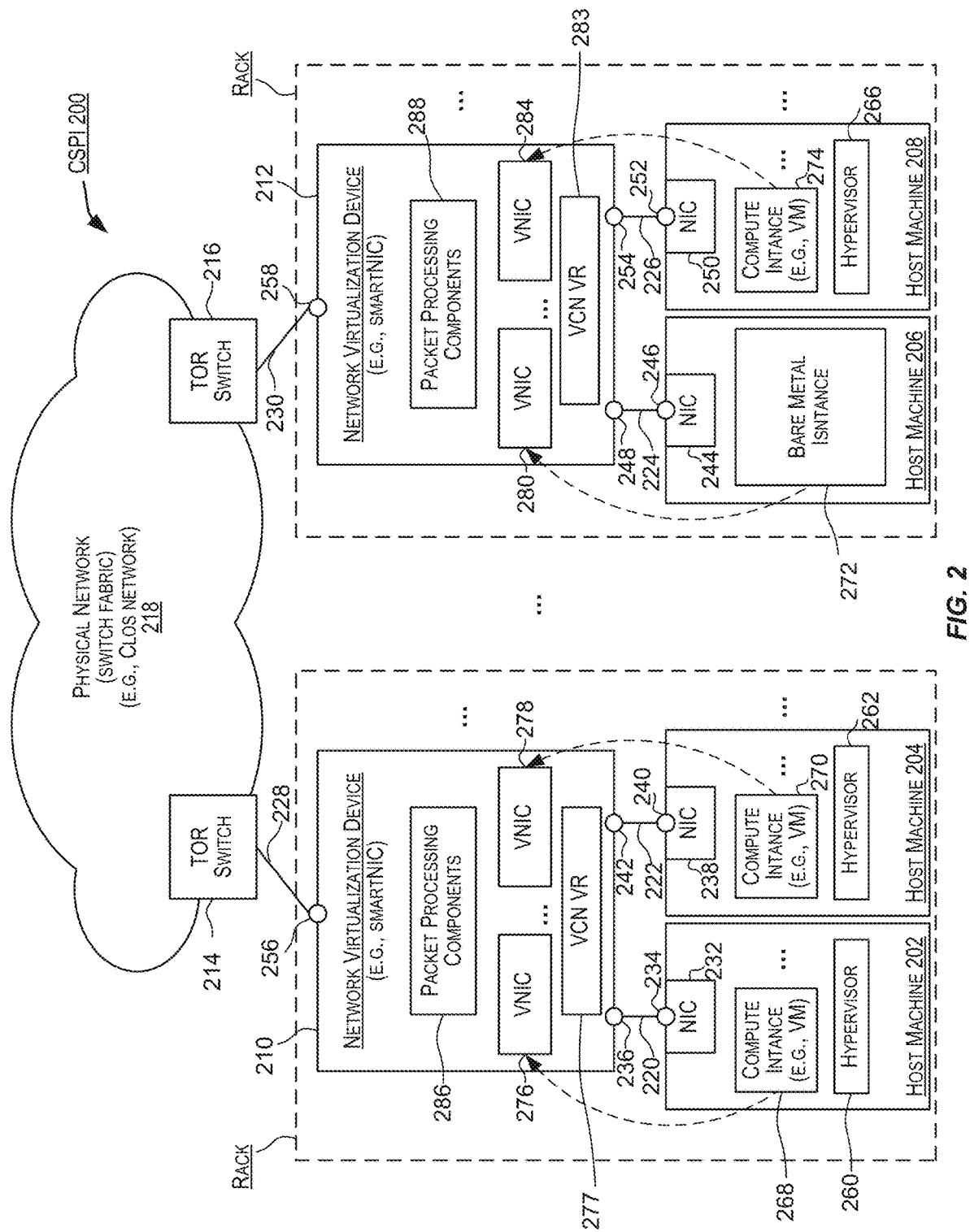
FIG. 2 depicts a simplified architectural diagram of the physical components in the physical network within cloud service provider infrastructure (CSPI) according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
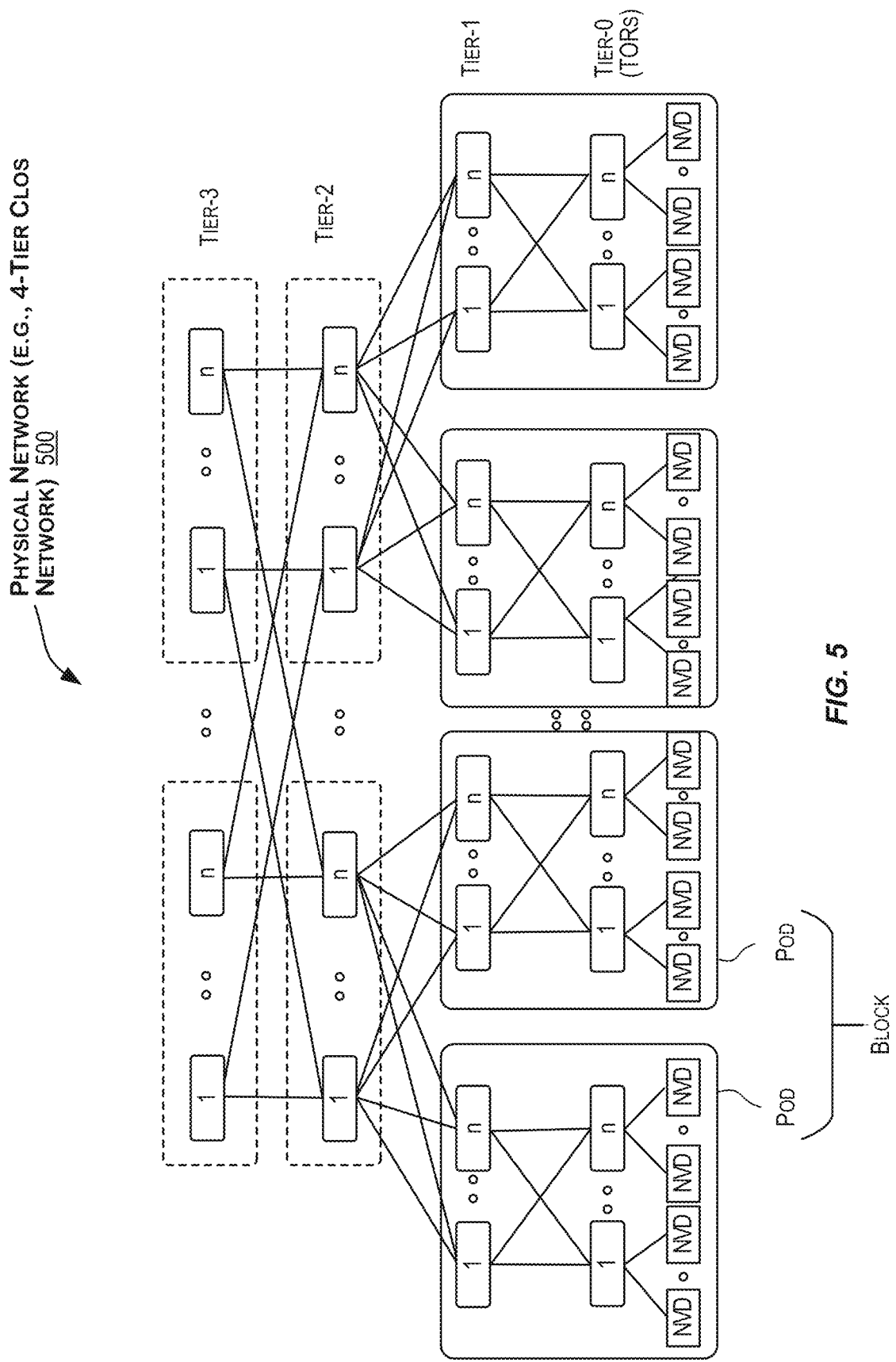
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
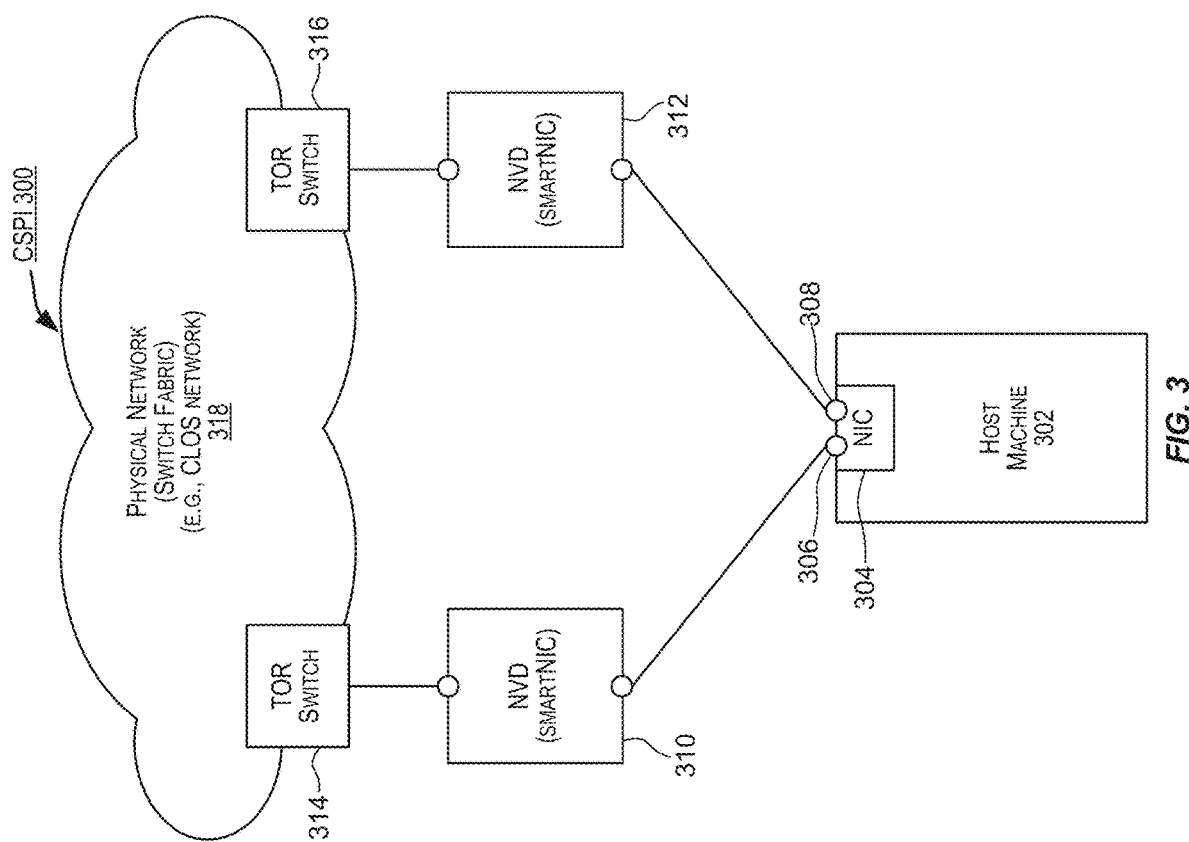
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 16, 17, 18, and 19 (see references 1616, 1716, 1816, and 1916) and described below. Examples of a VCN Data Plane are depicted in FIGS. 16, 17, 18, and 19 (see references 1618, 1718, 1818, and 1918) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

Figure 4:
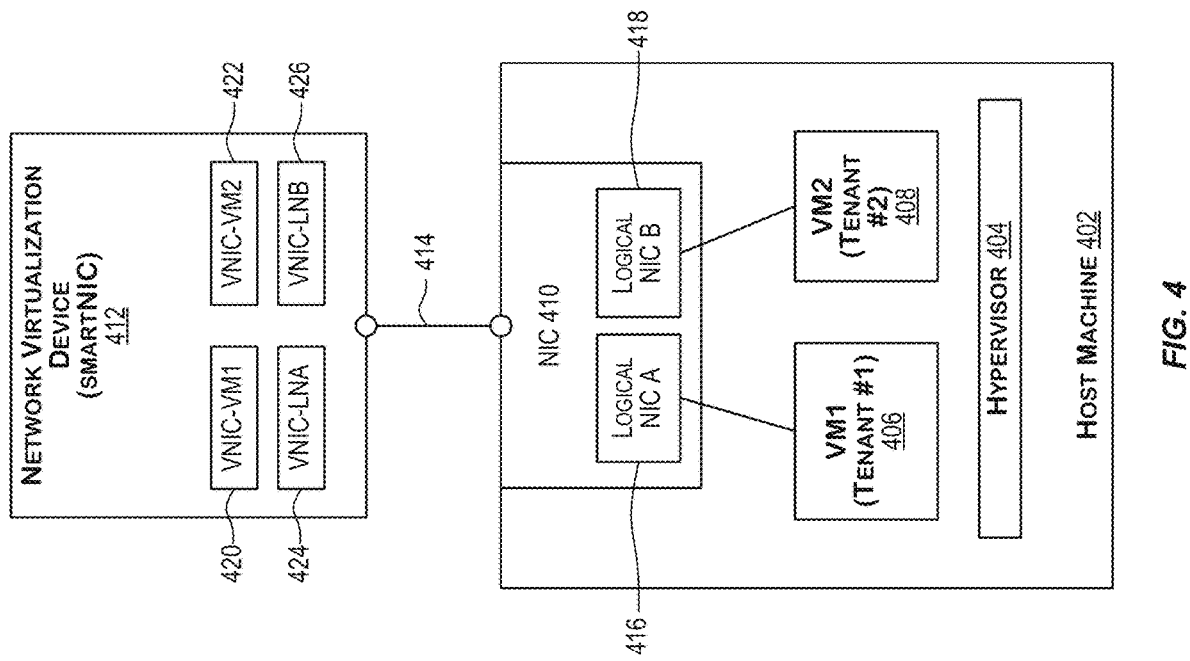
FIG. 4 depicts connectivity between a host machine and an NVD for providing I/O virtualization for supporting multitenancy according to certain embodiments.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where, ocid1: The literal string indicating the version of the CID;
resource type: The type of resource (for example, instance, volume, VCN, subnet, user, group, and so on);
realm: The realm the resource is in. Example values are "c1" for the commercial realm, "c2" for the Government Cloud realm, or "c3" for the Federal Government Cloud realm, etc. Each realm may have its own domain name;
region: The region the resource is in. If the region is not applicable to the resource, this part might be blank;
future use: Reserved for future use.
unique ID: The unique portion of the ID. The format may vary depending on the type of resource or service.

Figure 6:
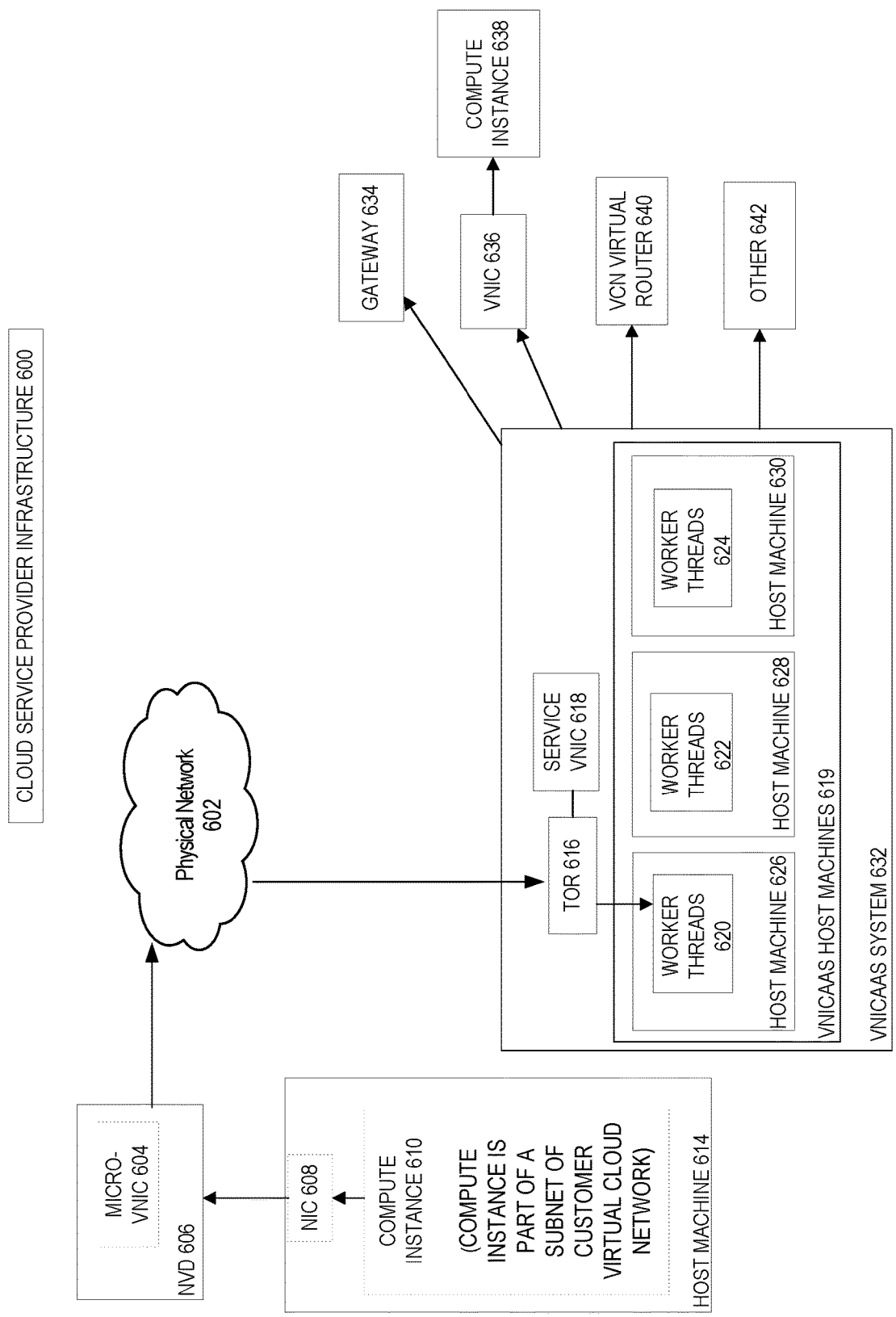
FIG. 6 is a simplified block diagram of a distributed virtualized environment that may be hosted by CSPI provided by an IaaS cloud service provider (CSP) and may include a VNICaaS system according to certain embodiments.

FIG. 6 is a simplified block diagram of a distributed virtualized environment 600 that may be hosted by CSPI provided by an IaaS cloud service provider (CSP) and may include a VNICaaS system according to certain embodiments. Distributed environment 600 comprises multiple systems that are communicatively coupled via physical network or switch fabric 602. Physical network 602 may comprise multiple networking devices, such as multiple switches, routers, etc., that enable communications using protocols such as Layer-3 communication protocols. In certain implementations, physical network 602 may be an n-tiered Clos network as depicted in FIG. 5 and described above. The value of "n" may be one, two, three, etc., depending upon the implementation.

Distributed environment 600 depicted in FIG. 6 is merely an example and is not intended to unduly limit the scope of claimed embodiments. Many variations, alternatives, and modifications are possible. For example, in some implementations, distributed environment 600 may have more or fewer systems or components than those shown in FIG. 6, may combine two or more systems, or may have a different configuration or arrangement of systems. The systems, subsystems, and other components depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

As shown in FIG. 6, distributed environment 600 includes a host machine 614 that may host one or more compute instances belonging to one or more customer VCNs. Host machine 614 is connected to NVD 606 via network interface card (NIC) 608. Host machine 614 is communicatively coupled to VNICaaS system 632 via NVD 606 and physical network 602.

In FIG. 6, host machine 614 hosts a compute instance 610, which may be a virtual machine compute instance or a bare metal instance. Compute instance 610 may be part of a customer VCN, where the VCN may include one or more subnets and compute instance 610 belongs to one of the subnets of the VCN. Compute instance 610 may participate in the VCN via micro-VNIC 604 that is associated and configured for compute instance 610 and the micro-VNIC is executed by NVD 606.

In certain implementations, a packet originating from compute instance 610 is communicated from host machine 614 to NVD 606 via NIC 608. NVD 606 executes software that is configured to provide functionality corresponding to micro-VNIC 604 associated with compute instance 610 (also referred to as the NVD executing the micro-VNIC). Per the execution of micro-VNIC 604, the packet is forwarded from NVD 606 to VNICaaS system 632 via physical network 602. VNICaaS system 632 is configured to process the packet and forward it to an endpoint based upon the intended destination of the packet. In certain implementations, a tunneling protocol is used to communicate the packet from NVD 606 to VNICaaS system 632. VNICaaS system 632 may forward the packet to one of more of multiple endpoints, such as a gateway 634, a VNIC 636 associated with another compute instance 638, a VCN ritual router 640, or some other endpoint 642.

In certain implementations, micro-VNIC 604 is a special type of VNIC that is configured to perform only a small subset of the functions performed by a regular VNIC associated with a compute instance and executed by an NVD. In certain implementations, a micro-VNIC is configured to simply transfer packets received from compute instance 610 to VNICaaS system 632 without processing the packets for security rules such as firewall rules, without performing any routing-related processing associated with identifying the destination of the packets and finding next hops for the packets, or performing other traditional VNIC-related functions. The micro-VNIC 604 acts as a pass-through to communicate the packets received by NVD 606 from compute instance 610 to VNICaaS system 632. A micro-VNIC may be configured and associated with a particular compute instance (e.g., micro-VNIC 604 is associated with compute instance 610) when the particular compute instance is added to a VCN.

While a micro-VNIC 604 is depicted in FIG. 6, in other embodiments, other types of VNICs, including regular VNICs executed by NVDs and associated with compute instances may be configured to act like micro-VNICs and act as a bypass and forward packets to VNICaaS system 632 for further processing. In certain implementations, a regular or standard VNIC may be configured to act like a micro-VNIC and forward a packet to VNICaaS system 632 when certain conditions are met. For example, in the case of a regular or standard VNIC configured to have as its intended destination a service endpoint, then the standard VNIC may also forward traffic to the VNICaaS system 632 for processing purposes.

VNICaaS system 632 is configured to perform packet processing functions for packets received from multiple compute instances belonging potentially to different VCNs, and belonging potentially to different customers or tenants. In this manner, VNICaaS system 632 provides a centralized processing entity for providing dedicated packet processing services for multiple compute instances belonging to multiple customers and belonging to multiple VCNs. VNICaaS system 632 includes a fleet of computers that are dedicated to perform packet processing functions. The VNICs-related packet processing performed by VNICaaS system 632 is not restricted by the resources available to an NVD as in prior implementations. This fleet of computers that constitute VNICaaS system 632 can be scaled up (or down) as needed, providing for a highly scalable (e.g., horizontally scalable) and highly available architecture for processing from and to compute instances in distributed environment 600. VNICaaS system 632 is capable of hosting multiple VNICs. The VNICs hosted by VNICaaS system 632 are referred to as "service VNICs" (e.g., service VNIC 618 depicted in FIG. 6) to differentiate them from the micro-VNICs and traditional VNICs associated with compute instances. The processors of the fleet of computers that constitute VNICaaS system 632 are configured to execute software and processes/threads to implement and execute the service VNICs functionality. While FIG. 6 depicts a single service VNIC 618, this is not intended to be limiting. Typically, VNICaaS system 632 may execute or provide functionality for multiple service VNICs for processing network traffic.

In certain implementations, the CSPI may provide various APIs, console interfaces, etc., for configuring service VNICs and associating micro-VNICs (or regular VNICs) with service VNICs. For example, a service may be created and associated with a particular micro-VNIC when the micro VNIC is created and associated with a compute instance. This creation and association between compute instances, micro-VNICs, and service VNICs may be provided and managed by the virtual cloud network control plane. For example, an API may enable creation of a service VNIC (e.g., service VNIC 618) that is associated with micro-VNIC 604, which in turn is associated with compute instance 610. APIs may be provided to specify metadata for a service VNIC, where the metadata includes information such as security or firewall rules for the service VNIC, forwarding rules, IP addresses associated with the service VNIC, and the like. APIs may also be provided to enable modifications or changes to the created service VNICs. For example, an API may be provided to add or remove IP addresses from a service VNIC, or to update a forwarding rule for the IP address for the service VNIC. A forwarding rule for a service VNIC may specify how a packet that is to be processed according to the service VNIC should be forwarded. In certain implementations, multiple VNICs (e.g., regular VNICs or micro-VNICs may be associated with the same service VNIC).

In the embodiment depicted in FIG. 6, VNICaaS system 632 includes a Top of Rack switch (TOR) 616 that is connected to multiple data processing systems or host machines 619 including machines 626, 628, 630. The TOR switch 616 receives packets that are forwarded to VNICaaS system 632 for packet processing. TOR switch 616 is then configured to select, from the multiple host machines that are connected to TOR switch 616 and that are available for packet processing, a particular host machine for processing the received packet. For example, TOR switch 616 depicted in FIG. 6 may select one of host machines 626, 628, and 630 for processing a packet originated by compute instance 610 and forwarded to VNICaaS system 632 by NVD 606. While three host machines 626, 628, and 630 are shown in FIG. 6 as being part of VNICaaS system 632, this is not intended to be limiting. In alternative embodiments, a VNICaaS system may have more or less than three host machines. The set of host machines 619 work together to provide a highly-available environment with adequate bandwidth to process large volumes of network traffic communicated between virtual networks in distributed environment 600.

The host machine selected by the TOR switch is then responsible for further processing of the packet. Each host machine comprises compute (e.g., one or multiple processors), storage (e.g., system memory and storage), and networking resources that are available for packet processing performed by the host machine. In certain implementations, a set of multiple processes or threads is configured on each host machine for processing packets received by the host machine. For example, as depicted in FIG. 6, a set of worker threads 620 is available on host machine 626 to process packets received by host machine 626 for processing from TOR switch 616. In a similar manner, a set of worker threads 622 is configured and available for host machine 628, and a set of worker threads 624 is configured for and available for processing performed by host machine 630.

Upon receiving a packet for processing from the TOR switch, a host machine is configured to select an available worker thread, from the set of worker threads configured for that host machine, for processing the packet. In certain implementations, the selected worker thread is configured to examine the received packet (e.g., one or more headers of the packet) and determine a service VNIC for processing the packet. In certain embodiments, the service VNIC is selected based upon information identifying the sender of the packet. For example, in FIG. 6, for a packet received from compute instance 610 via NVD 606, the header of the received packet may identify one or more of the sender compute instance 610, the NVD 606 from which the packet is received, and the micro-VNIC 604. Based upon this information, the host machine may select a particular service VNIC for processing the packet. For example, the selected service VNIC may be one that is associated with micro-VNIC 604.

The packet is then processed by the worker thread according to the selected service VNIC. For example, the selected VNIC may have associated metadata that specifies security and firewall rules, forwarding rules, routing protocols, etc. The worker thread executes functionality for selected service VNIC by enforcing the rules associated with the service VNIC. For example, the worker thread may determine, based upon the security or firewall rules, if communication of the packet to its intended destination (i.e., the destination address specified in the packet) is allowed or not. The enforcement of these various rules, which in previous architectures was executed by the NVD executing a VNIC associated with a compute instance, is now instead executed by VNICaaS system 632.

As part of the processing performed by a worker thread, the worker thread is configured to identify a next-hop target to which the packet is to be sent. In certain implementations, the next hop target is determined based upon the destination of the packet and based upon routing rules specified by the service VNIC that is selected for processing the packet. The worker thread is then configured to send the packet to the determined next-hop target. Examples of next-hop targets include without limitation a gateway 634, another VNIC 636 associated with a compute instance 638, a VCN virtual router 640, or some other next-hop target 642. The next hop that is selected is one that facilitates communication of the packet to its intended destination, for example, the next-hop target may then forward the packet to its destination. For example, if the destination for a packet from compute instance 610 is a compute instance 638, an NVD hosting VNIC 636 associated with compute instance 638 may be identified by the worker thread as the next hop and the packet may be forwarded to that NVD.

As depicted in FIG. 6, a gateway 634 may be selected as a next-hop target based upon the intended destination of the packet. There could be different kinds of gateways based upon the destinations. Examples of gateways have been described above and may include a Dynamic Routing Gateway (DRG), Network Address Translation (NAT) gateway, Private Access Gateway (PAGW), a service gateway (SGW), or any other types of gateways.

Figure 7:
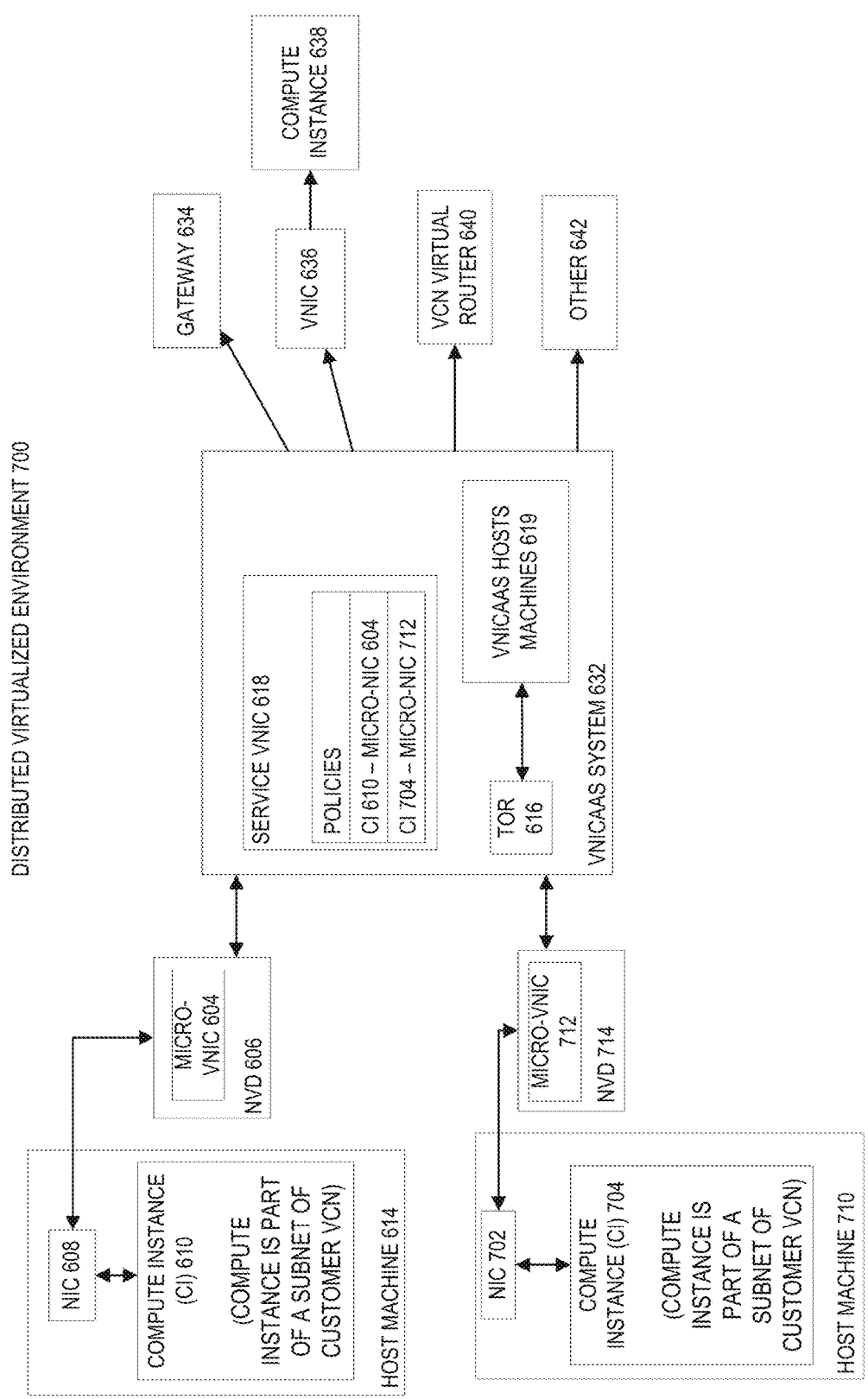
FIG. 7 is a simplified block diagram of a distributed environment that includes a VNICaaS system and builds upon the distributed environment depicted in FIG. 6 according to certain embodiments.

FIG. 7 is a simplified block diagram of a distributed environment 700 that includes a VNICaaS system and builds upon the distributed environment depicted in FIG. 6. As shown in FIG. 7, distributed environment 700 includes several components from FIG. 6, which are numbered using the same reference numbers as in FIG. 6. Additionally, distributed environment 700 includes a host machines 710 that hosts compute instance 704, which is associated with micro-VNIC 712. Compute instance 610 via its associated micro-VNIC 604 and compute instance 704 via its micro-VNIC 712 may be members of the same customer VCN. The compute instances may be on the same or different subnet of the VCN. As shown in FIG. 7, host machine 710 is connected to NVD 714 via network interface card (NIC) 702. Host machine 710 is communicatively coupled to VNICaaS system 632 via NVD 714 and a physical network (not shown) such as physical network 602.

In certain implementations, a packet originating from compute instance 704 is communicated from host machine 710 to NVD 714 via NIC 702. NVD 714 executes software that is configured to provide functionality corresponding to micro-VNIC 712 associated with compute instance 704. As a result of micro-VNIC 712, the packet is forwarded from NVD 714 to VNICaaS system 632. VNICaaS system 632 is then configured to process the packet and forward it to an endpoint based upon the intended destination of the packet.

In the implementation depicted in FIG. 7, both micro-VNICs 604 and 712 are associated with service VNIC 618. Accordingly when packets from the compute instances are received by VNICaaS system 632, the same service VNIC 618 is selected for processing the packets. This is an example of a situation where packets originating from different compute instances are processed by VNICaaS system 632 using the same service VNIC 618. This was not possible in previous implementations in which there was a one-to-one correspondence between compute instances and VNICs used to route packets from the compute instances. This is one way in which service VNICs hosted by VNICaaS system 632 provide scaling of VNICs.

In certain implementations, service VNIC 618 is a scalable interface that can be positioned in front of a service that is running behind a gateway or collection of hosts. Different cloud services may be fronted by one or more service VNICs 618. The service VNIC 618 presents a configuration attachment point for customers where the security and routing policy can be specified that should be applied to traffic to and from that service VNIC 618.

Figure 8:
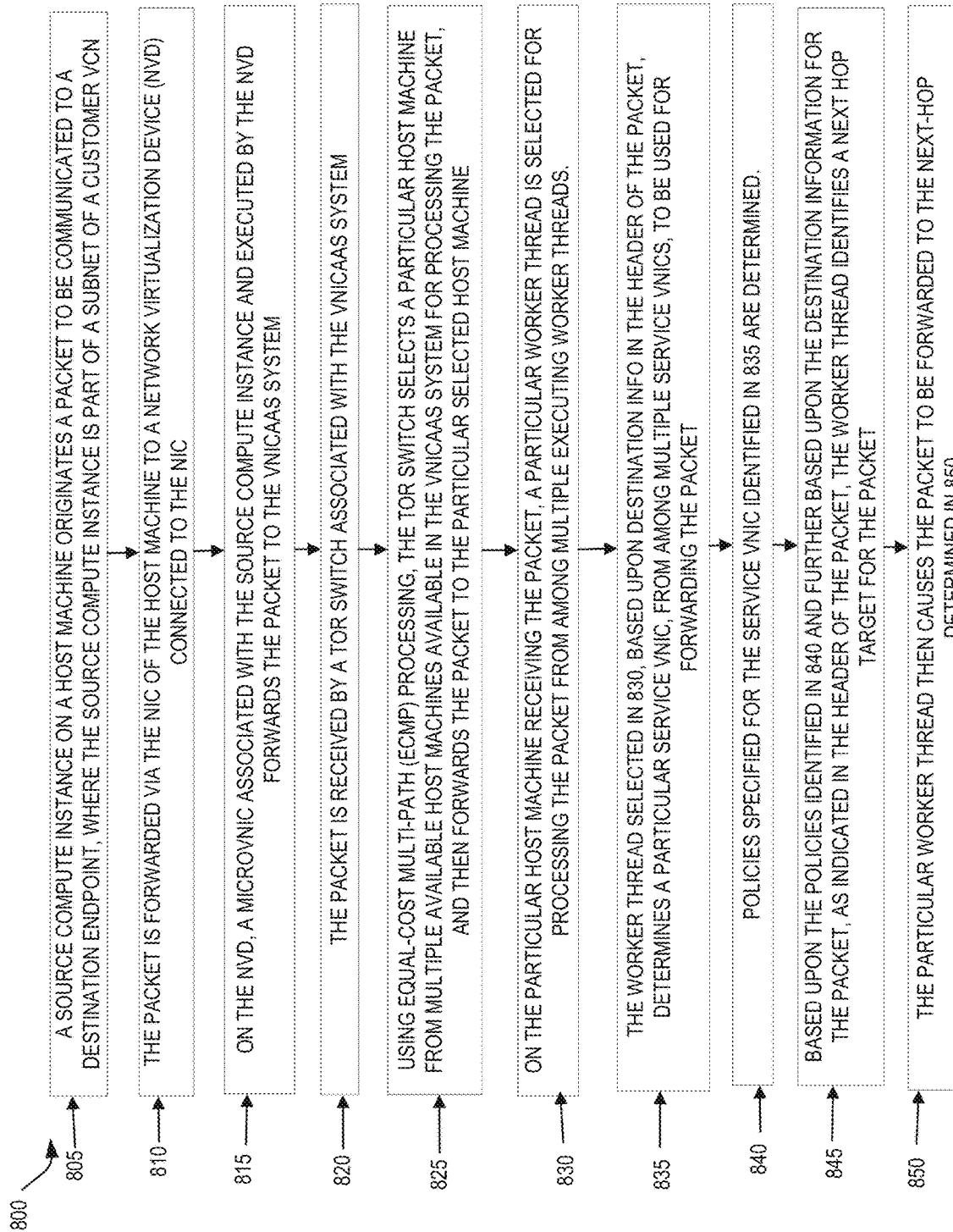
FIG. 8 depicts a simplified flowchart illustrating processing of packets using a VNICaaS system according to certain embodiments.

FIG. 8 depicts a simplified flowchart 800 illustrating processing of packets using a VNICaaS system according to certain embodiments. The processing depicted in FIG. 8 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the processing may be performed in some different order or some steps may also be performed in parallel.

As depicted in FIG. 8, processing is initiated in 805, wherein a source compute instance on a host machine originates a packet to be communicated to a destination endpoint. The source compute instance may be part of a subnet of a customer VCN. For example, in FIG. 6, compute instance 610 hosted by host machine 614 may originate a packet destined for compute instance 638.

At 810, the packet is forwarded from the host machine hosting the originating compute instance, via a NIC on the host machine, to a NVD implementing a VNIC associated with the originating compute instance. For example, in FIG. 6, the packet is communicated from host machine 614, via NIC 608 of host machine 614, to NVD 606 connected to host machine 614, and which executes micro-VNIC 604 associated with compute instance 610.

At 815, the receiving NVD executes the micro-VNIC associated with the originating compute instance and forwards the packet to the VNICaaS system. For example, in FIG. 6, as a result of micro-VNIC 604, the packet is forwarded from NVD 606 to VNICaaS system 632. The packet is processed by VNICaaS system 632.

In certain implementations, a tunneling protocol is used to communicate the packet from NVD 606 to VNICaaS system 632. Various different tunneling protocols may be used such as IP-in-IP (or Generic Routing Encapsulation (GRE)), Virtual Extensible LAN (VxLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others. Tunneling typically involves encapsulating the received packet in one or more headers and the information in the headers is used to communicate the packet from the NVD to the VNICaaS system via a physical substrate network. Tunneling in a virtualized network enables traffic to be communicated from one end point (e.g., the NVD sending a packet) to another end point (e.g., VNICaaS system) without making any changes to the original packet received by the sending NVD. Processing related to encapsulating the packet are performed by the sending NVD. For example, in FIG. 6, the packet encapsulation is performed by NVD 606. Operations pertinent to packet processing e.g., encapsulation, mapping, etc., are described later with reference to FIGS. 11A-11C.

At 820, the packet sent by the NVD is received by a TOR switch associated with the VNICaaS system. For example, in FIG. 6, the packet sent by NVD 606 may be received by TOR switch 616.

At 825, the TOR switch receiving the packet in 820 uses a selection technique to select a particular host machine from multiple available host machines in the VNICaaS system for processing the packet, and then forwards the packet to the particular selected host machine. Various different selection techniques may be used by the TOR switch for selecting a particular host machine for processing the packet. In certain implementations, the TOR switch uses Equal-Cost Multi-Path (ECMP) processing to select a particular host machine for processing the packet. For example, in FIG. 6, TOR 616 may use ECMP to select one of host machines 626, 628, and 630 for processing the received packet. As an example, it is assumed the TOR switch 616 selects host machine 628 for processing the packet and forwards the packet to the selected host machine.

At 830, on the particular host machine selected in 825 and that receives the packet from the TOR switch, a particular worker thread is selected for processing the packet from among multiple available worker threads configured and executing on the host machine for processing packets. For example, in FIG. 6, host machine 628 may select one of worker threads 622 for processing the packet.

In step 835, the worker thread selected in 830 identifies a particular service VNIC for processing the packet from among multiple service VNICs hosted by the VNICaaS system for processing packets. For example, in FIG. 6, the worker thread may identify, for example, service VNIC 618 for processing the packet.

Various different ways may be used for selecting a service VNIC. In certain embodiments, the particular service VNIC is selected based upon information in the packet. For example, in some instances, the particular service VNIC may be selected based upon information in the packet header regarding the source of the packet. For example, the packet may have a header that includes labels identifying source and destination information for the packet. The source label may, for example, identify the source VNIC from which the packet was received (e.g., micro-VNIC 604 in FIG. 6) and a destination label may identify a destination for the packet (e.g., a destination VNIC such as VNIC 636 in FIG. 6).

In certain instances, the service VNIC may be selected in 835 based upon the source label information. For example, the source VNIC may be identified from the packet. A search may then be performed to find a service VNIC associated with the source VNIC and that service VNIC is selected in 835. As previously indicated, the association between a VNIC and a service VNIC may be configured when the compute instance is associated with the VNIC. This association or mapping may be stored as configuration information accessible to the VNICaaS system. This information may be generated by the VCN control plane.

In some other instances, the service VNIC may be selected based upon the information in the destination label of the packet. For example, if the destination label identifies a PE-VNIC or a VNIC associated with a particular service or service instance, a service VNIC associated with that PE-VNIC or VNIC may be selected in 835 for processing the packet. In yet other instances, the information in the packet header identifying the source of the packet (e.g., information in the source label) and information identifying the destination of the packet (e.g., information in the destination label) may be used for selecting a particular service VNIC to be used for processing the packet.

As previously indicated, a service VNIC may have metadata associated with it where the metadata identifies one or more policies identifying various rules such as security or firewall rules, forwarding or routing rules controlling how a packet is to be forwarded, and other rules. At 840, one or more policies and rules specified for the service VNIC identified in 835 are determined. In certain implementations, the service VNICs and the associated policies may be stored in a memory location accessible to the host machine that receives the packet for processing.

At 845, the worker thread processing the packet applies the one or more policies associated with the selected service VNIC, and further based upon the destination information for the packet (e.g., destination information in the IP packet header), identifies a next-hop target for the packet. Examples of net hop targets include a gateway, another VNIC associated with a compute instance to which the packet is directed, and the like. For example, in FIG. 6, if the destination of the packet is compute instance 638, the VNIC 636 associated with the compute instance may be identified as the next hop target in 845.

At 850, the particular worker thread processing the packet then causes the packet to be forwarded to the next-hop target determined in 845. In certain implementations, the worker thread may update a header of the packet prior to forwarding the packet to the next-hop target.

In certain instances, it is possible that, in 845, multiple next hop targets are identified for the packet. This may happen, for example, when multiple micro-VNICs are identified as targets by the service VNIC selected for processing the packet. In such a situation, one of the multiple next hop targets is selected in 845 and then, at 850, the packet is forwarded to that selected target. This selection of one target from among multiple identified targets may enable the VNICaaS system to distribute packets across the multiple identified targets and thus perform load balancing of the traffic across the multiple targets. Various different techniques may be used to select a single next hop target from among multiple identified next hop targets.

Figure 9:
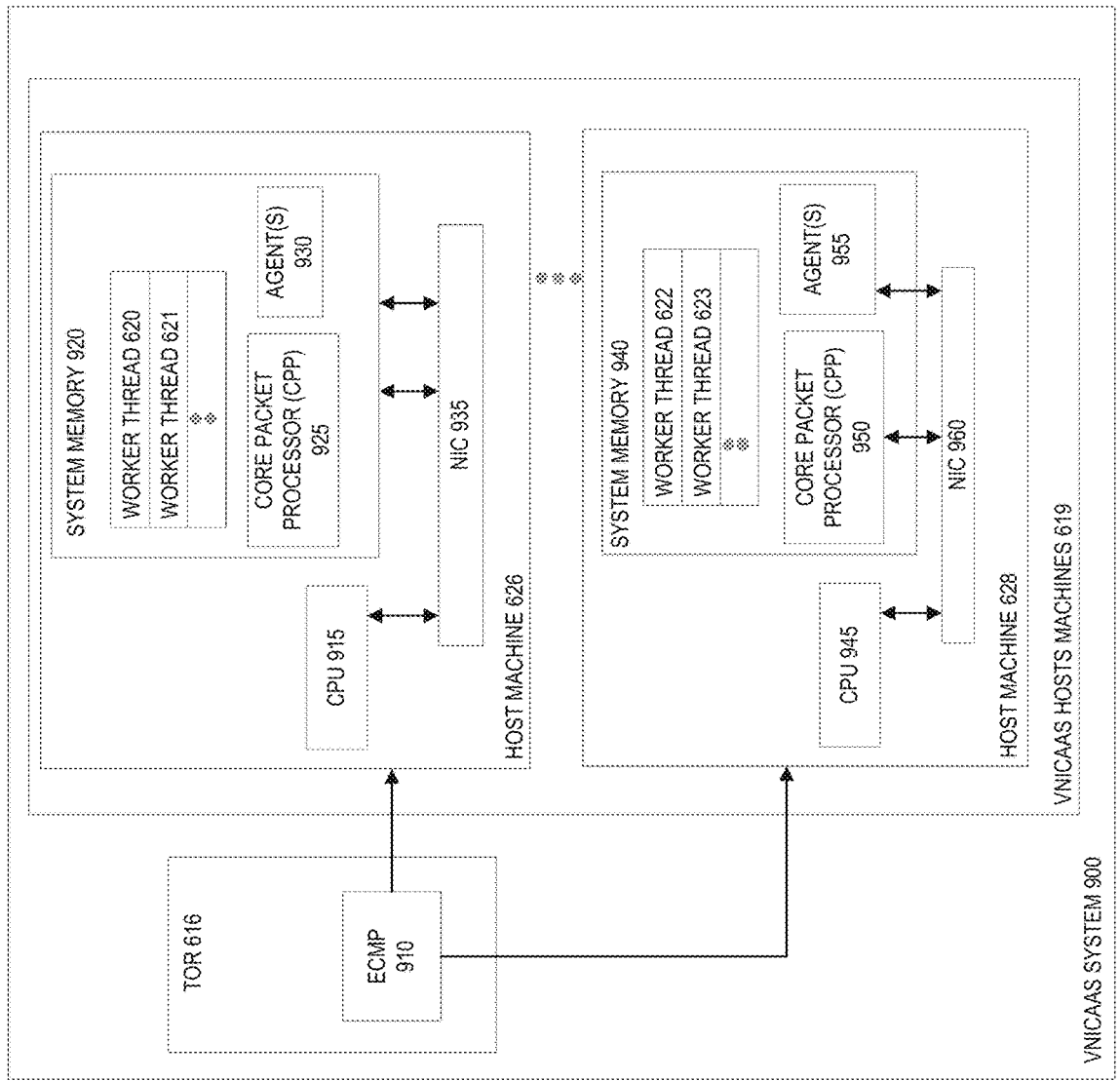
FIG. 9 is a simplified block diagram depicting components within a VNICaaS system according to certain embodiments.

FIG. 9 is a simplified block diagram depicting components within a VNICaaS system according to certain embodiments. FIG. 9 depicts components of VNICaaS system 632 depicted in FIG. 6. The configuration of VNICaaS system 632 depicted in FIG. 9 is merely an example and is not intended to unduly limit the scope of claimed embodiments. Many variations, alternatives, and modifications are possible. For example, in some implementations, VNICaaS system 632 may implemented having more or fewer systems or components than those shown in FIG. 9, may combine two or more systems, or may have a different configuration or arrangement of systems. The systems, subsystems, and other components depicted in FIG. 9 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

As depicted in FIG. 9, VNICaaS system 900 comprises a TOR switch 616 that is connected to a set of host machines 619, including host machines 626 and 628. TOR switch 616 includes an ECMP subsystem 910 that is configured to perform ECMP processing to select one of host machines 619 for processing a packet received by the TOR switch. The ECMP protocol may rebalance load as needed between available VNICaaS host machines, and also as one or more host machines are added or removed from VNICaaS system. VNICaaS system may advertise a Virtual Internet Protocol (VIP) address via Border Gateway Protocol (BGP). Packets addressed to that VIP address are received by TOR switch 616 and then forwarded to one of the host machines 619 for further processing. The host machines 619 provide a highly-available environment with adequate bandwidth to process network packets.

In certain embodiments, the VNICaaS host machines may advertise their addresses via Border Gateway Protocol (BGP) to the TOR switch. The TOR switch 616 may then use ECMP protocol processing to identify a specific VNICaaS host machine from the multiple host machines advertised over BGP. In some implementations, the VNICaaS host machines may advertise multiple IP addresses corresponding to multiple tasks to be performed by the host machines. The TOR switch 616 may classify incoming packets based on the configured tasks to be performed on the packets and relevant IP addresses associated with host machines for performing those tasks.

In some implementations, a VNICaaS host machine (e.g., host machines 626 and 628) may contain a NIC, one or more CPUs, system memory (e.g., RAM) that may be communicatively coupled to each other via one or more system buses. For example, in FIG. 9, host machine 626 comprises a NIC 935, a CPU 915, and system memory 920, and host machine 628 comprises a NIC 960, a CPU 945, and system memory 940. Various software components may be stored and/or executed by the CPU of a host machine in the host machine's system memory. For example, in FIG. 9, the components include a set of worker threads, a Core Packet processor (CPP), and one or more processing agents. Using host machine 626 as an example, system memory 920 includes a set of worker threads including workers 620, 621, a CPP 925, and agents 930. Host machine 628 comprises a system memory 940 executing a set of worker threads including threads 622 and 623, a CPP 950, and agents 955.

In some implementations, the Core Packet processor (CPP) of a host machine works in conjunction with the worker threads and is configured to process and forward the traffic received by the host machine 626 for processing. In certain implementations, CPP 925 may be a multi-threaded Data Plane Development Kit (DPDK) application that processes the network traffic. In an example embodiment, the CPP may include a plurality of pipelines for forwarding traffic from a compute instance to a target or an endpoint, and forwarding traffic from the endpoint to the compute instance. The CPP may use or include a number of identical workers threads (e.g., worker thread 620, worker thread 621, etc.) to process and forward traffic. In certain implementations, the CPP may flow-hash the incoming packets and then select a particular worker thread to process the packet, such that packets are evenly distributed and load balanced between the available worker threads. A worker thread then processes the packet including selecting a service VNIC, determining policies for the selected service VNIC, finding a next hop target, and forwarding the packet to the identified next hop target, as described above with respect to FIG. 8. In certain implementations, a worker can over time process packets using multiple service VNICs. Accordingly, the same worker thread can be used to process multiple packets using multiple service VNICs.

In an alternative implementation, the CPP may analyze a received packet and identify a specific worker thread to send the packet to be forwarded to its destination. In some implementations, the $0^{th}$ worker thread (e.g., thread 620) may handle periodic housekeeping tasks such as accumulating metrics.

As indicted above, a host machine in VNICaaS system 900 may comprise one or more agents to support processing of network packets. For example, in FIG. 9, host machine 626 contains agents 930 executing in system memory 920, and host machine 628 contains agents 955 executing in system memory 940. The one or more agents may include a configuration agent. A configuration agent may be configured to ingest a VCN configuration from VCN control plane. The configuration agent may provide configuration information required to process packets from the VCN control plane, including: IP address assignments, security rules, route rules, other VNIC locations, etc.

The one or more agents may further include an Address Resolution Protocol (ARP) agent that monitors the TOR and sets up a layer 2 Media Access Control (MAC) address for a CPP. The one or more agents may include a State Replication Agent (SRA agent) that implements a distributed key-value storage of network state used by the CPP for distributed connection tracking. The one or more agents may include a BGP agent which advertises IP addresses associated with the VNICaaS host machines to the TOR via BGP.

In some implementations, the compute, memory, and networking resources of a VNICaaS system host machine may be organized or divided into multiple nodes. In a specific implementation, a VNICaaS host machine comprises two nodes, each node comprising of a CPU socket, a RAM, and a NIC. In this implementation, the NIC may present two Peripheral Component Interconnect (PCI) endpoints for the VNICaaS host machine. In such an embodiment, for packets received by the host machine, internally, the NIC of the host machine load-balances approximately half its traffic onto each of the PCI endpoints corresponding to the two nodes. A virtual function provides routing to and from one of the PCI endpoints.

In some implementations, a high-performance multi-threaded application (e.g., DPDK application) may be bound to a CPU (CPU socket) of each node. The application may not cross the domain of a node. Specifically, the multi-threaded application worker threads that provide VNICs functionality may be scheduled on the same node as the network card. A driver may support up to 16 workers or VNICs per a Virtual Local Area Network (VLAN). In some implementations, a VNICaaS host machine may utilize both nodes by instantiating two data planes, where each node is provided with a separate set of regional configuration from the data plane. Accordingly, a VNICaaS host machine can support two instances of the VCN data plane (one running on each node).

In some implementations, a VNICaaS host machine may also include a management port. The management port may allow for common management operations to be performed such as, software deployment to host machine, OS patching on the host machine, operator access to the host machine for maintenance or troubleshooting, etc.

Figure 10:
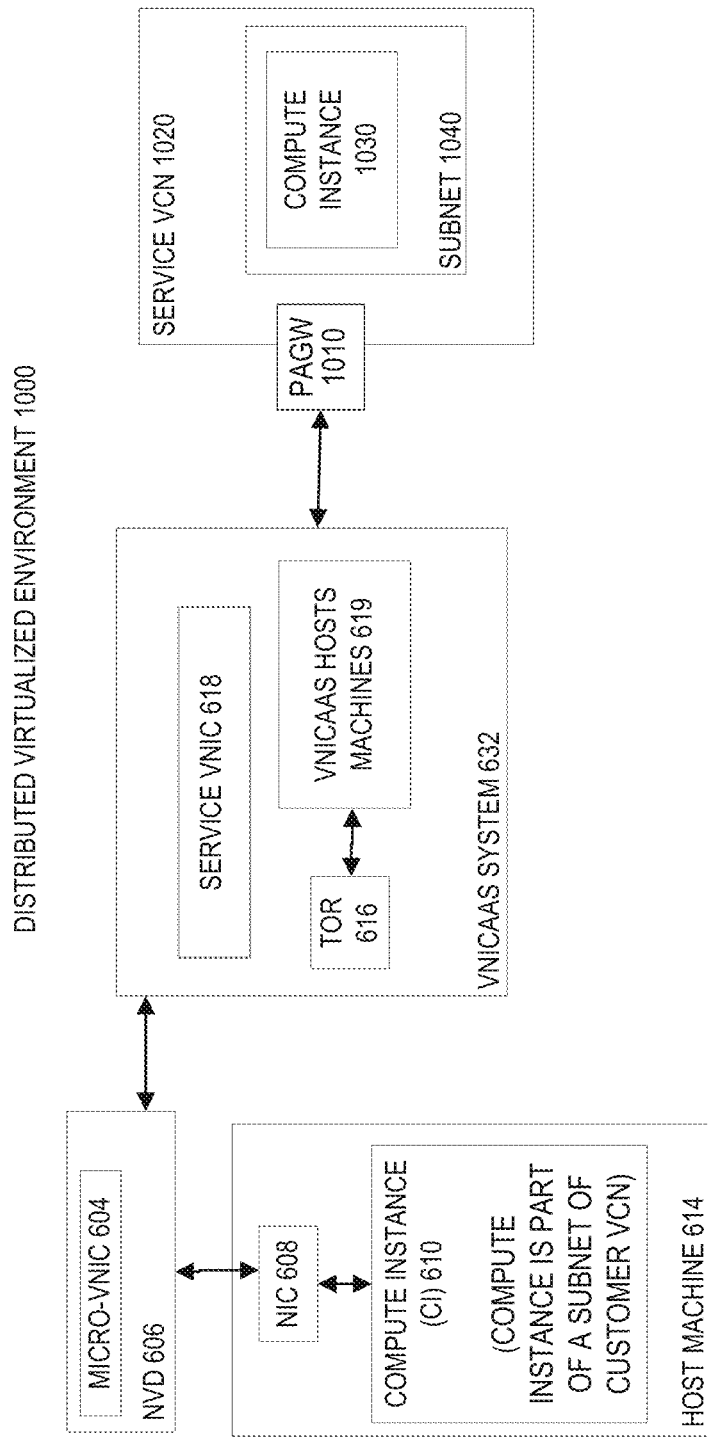
FIG. 10 depicts distributed environment comprising a VNICaaS system and the flow of packets for a particular use case between a customer's virtual cloud network and a service provider's virtual cloud network using the VNICaaS system, according to certain embodiments.

FIG. 10 depicts distributed environment 1000 comprising a VNICaaS system and the flow of packets for a particular use case between a customer's virtual cloud network and a service provider's virtual cloud network using the VNICaaS system, according to certain embodiments. Specifically, the use case depicted in FIG. 10 relates to sending packets from a customer compute instance in a customer VCN to a compute instance implementing a service (referred to as a service compute instance or service instance) using a VNI- CaaS system, where the service instance is exposed via a private endpoint in the customer's VCN.

As previously described, a service provider can provide a service using one or more compute instances hosted by CSPI. The provided service may be consumed by one or more subscribing customers of the service. Different access models may be used to provide access to the service. According to a public access model, the service may be exposed as a public endpoint that is publicly accessible by compute instances in a customer VCN via a public network such as the Internet. According to a specific private access model, the service is made accessible as a private IP endpoint in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a PE-VNIC. Since the endpoint is exposed as a VNIC, all the features associated with a VNIC such as routing rules, security lists, etc., are now available for the PE VNIC.

For the example embodiment depicted in FIG. 10, it is assumed that a packet is to be communicated from a compute instance 610 within a customer's VCN to a service compute instance 1030 within a service VCN 1020, where the service endpoint is exposed as a PE-VNIC within the customer VCN. Compute instance 610 may initiate a connection to the PE-VNIC 618 by generating a packet whose destination is the PE-VNIC.

In certain implementations, a service VNIC 618 corresponding to the PE-VNIC is hosted by VNICaaS system 632 that enables service providers to expose their service as a private instance in the customer's private network. Private Endpoint VNIC (or PE-VNIC) is a virtual networking feature enabling a customer access to multi-tenanted services hosted in other VCNs via a private access point whose configuration is under the customer's control. Specifically, a PE-VNIC represents a service associated with the compute instance 1030 within the service provider's VCN 1020. To a customer (e.g., customer instance 610), the PE-VNIC appears as a private endpoint in the same VCN as compute instance 610 and where the endpoint appears "attached" to the service with which the customer wishes to interact. To a service provider (e.g., compute instance 1030), PE-VNIC appears to be a gateway to (and from) which all traffic to customer VCNs flows.

In FIG. 10, a packet may be originated by compute instance 610 hosted by host machine 614, where the compute instance 610 is part of a subnet within a customer's VCN. The destination of the packet is the PE-VNIC. The packet may be communicated from host machine 614 to NVD 606 via NIC 608. On NVD 606, a micro-VNIC 604 associated with compute instance 610 is executed and the packet sent from NVD 606 to VNICaaS system 632. The packet may be sent VNICaaS system 632 using a tunneling protocol. In some embodiments, the IP address of the PE-VNIC corresponds to the virtual IP address or anycast address of VNICaaS system 632 and the packet is forwarded to the VNICaaS system 632. The packet may be communicated to VNICaaS system 632 by using anycast IP address associated with the VNICaaS system and overlay IP address for the PE-VNIC.

Tunneling the packet from NVD 606 to VNICaaS system 632 includes encapsulating the packet using one or more headers, wherein the header information is used to forward the packet to VNICaaS system 632. The various headers and their contents to perform the tunneling is shown in FIGS. 11A-11C and described below.

At VNICaaS system 632, the packet is received by TOR switch 616. In some embodiments, the packet includes a header comprising a source VNIC label identifying micro-VNIC 604 and a destination VNIC label identifying the PE Label or PE-VNIC. Within VNICaaS system 632, TOR switch 616 selects a host machine for processing the packet and the packet is transmitted to the selected host machine. On the host machine receiving the packet, a worker thread is selected for processing the packet from among multiple worker threads available on the selected host machine, as described above with respect to FIG. 8.

In certain implementations, the selected worker thread then performs the following processing:

(1) The worker thread identifies a destination IP address of the packet. Typically, network traffic is transmitted in the form of packets, where each packet includes a header and a payload. The header contains information regarding the source address, destination address, size, transport protocol used to transmit the packet, and various other identification information associated with the packet of data.

(2) The worker thread validates the destination IP address of the packet determined in (1) to ensure that the IP address is an Availability Domain (AD), regional or an anycast IP address associated with a service. An anycast IP address is an IP address that is associated with multiple machines within the service VCN 1020.

(3) The worker thread selects a service VNIC for processing the packet based on header information of the packet. In certain embodiments, the worker thread identifies a destination MPLS label from the packet and selects a VNIC based upon the MPLS label. Since the packet is directed to a PE-VNIC, the selected service VNIC is one corresponding to the PE-VNIC where the packet is to be sent. The worker thread obtains metadata and configuration information of the PE-VNIC such as different policies associated with the service VNIC.

(4) The worker thread validates micro-VNIC (e.g., micro-VNIC 604) that was associated with compute instance sending the packet. In this step, the worker thread verifies that the substrate source IP address of the packet refers to the NVD of the associated micro-VNIC, for example, the physical IP address of NVD 606.

(5) The worker thread validates ingress firewall rules associated with the selected service VNIC for service VCN 1020. The ingress firewall rules specify the types of traffic (e.g., protocols and ports) that are allowed in and out of a compute instance 1030 within the service VCN 1020. A given rule may be stateful or stateless. For example, incoming secure shell (SSH) traffic from anywhere can access a set of instances by setting up a stateful ingress rule with source CIDR 0.0.0.0/0 and a destination Transmission Control Protocol (TCP) port.

(6) The worker thread identifies a next hop target for the packet. For example, the next hop target may be PAGW 1010 associated with service VCN 1020.

(7) The worker thread de-capsulates the packet by removing encapsulated header of the packet and then encapsulates the packet with MPLS labels where a source MPLS label is set to the PE-VNIC label and destination label is set based upon the next hop target determined in (6). For example, the destination label may identify the receiving gateway. In certain implementations, the source may be set to the VNICaaS system's IP address (e.g., anycast IP address) and destination of the packet may be set to data plane IP address (e.g., anycast IP address) associated with the destination service. The packet may then be forwarded to the anycast IP address associated with the service.

In certain implementations, the data plane associated with the service further may encapsulate the packet with substrate information associated with the compute instance 1030 and send the packet to a load balancer within the service VCN 1020. The data plane may be a "gateway" that does some packet processing before the service load balancer receives the packet. The load balancer then processes the packet and sends the packet to the destination compute instance 1030.

In one embodiment, as shown in FIG. 10, the packet may be communicated from VNICaaS system 632 to Private Access Gateway (PAGW) 1010. A PAGW 1010 is a type of a service gateway attached to a service provider VCN 1020 that acts as an ingress/egress point for all traffic from/to consumer endpoints. The PE-VNIC endpoint comprises information used for tunneling packets to and from the PAGW 1010. In this scenario, a tunnel is designed to forward traffic between VNICaaS system 632 and PAGW 1010. In an example embodiment, an implementation of PE-VNIC may involve VNICaaS hosts and Private Access Gateway (PAGW) 1010 hosted on a dedicated compute resources.

In certain implementations, a PE-VNIC that is implemented by a service VNIC hosted on VNICaaS system 632 does not have a compute instance attached to the PE-VNIC but instead acts as a tunnel to the PAGW, which in turn forwards traffic to the corresponding service provider (e.g., compute instance 1030). This arrangement enables a service provider to use the PE-VNIC for multiple backend compute instance connections without utilizing internal IP address resources of the service VCN. A single PAGW can be provided for any number of service endpoints registered in a single VCN. In a certain implementation, both the PE-VNIC and the PAGW may be hosted on a dedicated compute resource in VNICaaS system 632.

In the above scenario, a substrate tunnel may be used to forward traffic between VNICaaS host machine and PAGW host machines. In certain implementations, the substrate tunnel is implemented using Multiprotocol Label Switching (MPLS) over User Datagram Protocol (UDP). MPLS over UDP may facilitate the load balancing of MPLS application traffic across IP networks. In the above scenario, the MPLS over UDP enables VCN host-to-host encapsulation format for forwarding the traffic.

In certain embodiments, VNICaaS host machines 619 may classify traffic by knowing a relevant Virtual IP address (VIP) for the PAGW. If VNICaaS does not classify the traffic directed to PAGW then the traffic may be treated as a two-label tunnel traffic. The two-labels of a network packet may be a channel number and a group number to further classify the packets and their destinations. The first label indicates the sending VNIC (e.g., service VNIC 618 corresponding to the PE-VNIC) and the second label indicates the instance of PAGW receiving the traffic.

In the above embodiment, a CPP within a VNICaaS host may provide multiple instances of pipelines to forward traffic from PE-VNIC presented to a customer to PAGW tunnel. In the above scenario, the service VNIC implementing the PE-VNIC may be identified using a slot identifier for VNICs unlike traditional VNICs which are identified by unique NAT IP addresses. The slot identifier may act as an index to identify VNICs hosted on the VNICaas system 632.

A service instance 1030 receiving a packet from a compute instance (e.g., compute instance 610) may respond by communicating a response packet to customer instance 610. In certain implementations, VNICaaS system 632 facilitates communication of the response packet from service compute instance 1030 to compute instance 610.

In certain implementations, VNICaaS system 632 also stores information about the different traffic flows processed by VNICaaS system 632. For example, for a packet communicated from compute instance 610 to service compute instance 1030, VNICaaS system 632 (or more particularly, the host machine that was selected to process the packet) may first identify a particular traffic flow to which the packet belongs. This may be done by hashing the contents of one or more fields of the packet and the generated hash value represents a particular network traffic flow. In a specific example, the contents of the source IP, source port, destination IP, destination port, and protocol fields of the packet are hashed. State information is then stored by VNICaaS system 632 for the particular identified network flow, where the state information includes information such as the physical IP address of the NVD sending the packet (e.g., physical IP address of NVD 606), the source and destination information for the packet, and the like. This information may be stored in a flow table. Replication techniques may be used to replicate the flow table information to the various host machines in VNICaaS system 632 so that information regarding the various traffic flows and their state information is available to all the VNICaaS system host machines irrespective of which particular host machine processed the particular packet from compute instance 610 to compute instance 1030.

Upon receiving a response packet at VNICaaS system 632, a host machine within VNICaaS system 632 may be selected for processing the packet, and further a worker thread from multiple worker threads executed by the selected host machine may be selected for processing the response packet. In an example embodiment, the VNICaaS system host machine selected to process the response packet may be different from the VNICaaS host machine that processed the packet sent from compute instance 610 and compute instance 1030. In an example implementation, the following steps are performed by the worker thread to process and forward the response packet to NVD 606 associated with the customer instance 610:

(1) The worker thread hashes portions (e.g. contents of certain header fields) of the response packet to obtain a hash value that represents a particular traffic flow. For example, the source IP, source port, destination IP, destination port, and protocol fields of the response packet may be hashed.

(2) The worker thread then consults a flow table and determines state information for the particular traffic flow, where the state information identifies the physical IP address of an NVD associated with the NVD corresponding to the destination compute instance i.e., the intended destination of the reverse flow packet.

(3) The worker thread may perform some validations. For example, the worker thread may validate that the destination IP address is an Availability Domain IP address, a regional IP address or an anycast IP address within customer's virtual network.

(4) The worker thread then encapsulates the packet to prepare it to be communicated from the VNICaaS system to the NVD associated with the physical IP address determined in (2). As part of the processing in (4), the worker thread identifies the destination MPLS label from the response packet. The worker thread encapsulates the response packet with updated source and destination information. The substrate source and destination IP address are updated where the source IP is set to the anycast IP address of VNICaaS system 632 and the destination IP is set to the physical IP address of the receiving NVD 606 determined in (2).

(5) The response packet is then communicated from VNICaaS system 632 to NVD 606 using a tunneling protocol.

(6) The receiving NVD then forwards the response packet to compute instance 610, which is the intended destination of the response packet.

FIGS. 11A-11C depict an example of encapsulation techniques that are used to communicate a network packet from a customer's compute instance to a VNICaaS system according to certain embodiments. For the example depicted in FIGS. 11A-11C it is assumed that a packet is sent from a compute instance (e.g., compute instance 610 depicted in FIG. 10) to a service exposed by a PE-VNIC. FIG. 11A depicts the original packet that is originated by compute instance 608 and communicated to NVD 606. As shown in FIG. 11A, the packet includes several fields including fields storing information identifying a source IP address, a destination IP address, protocol information, a source port, and a destination port. The source IP address of the packet is set to the overlay IP address of compute instance 610, which is an IP address associated with the micro-VNIC 604 associated with compute instance 610. The destination IP address is set to that of the PE-VNIC. The source port is set to the client port associated with the compute instance and the destination port is set to a service port associated with the service. The protocol field is set to TCP.

NVD 606 executes functionality corresponding to micro-VNIC 604 and encapsulates the packet to prepare it to be communicated to VNICaaS system 632. As part of the encapsulation, as shown in FIG. 11B, a header is added to the original packet, where the header has the following fields: (a) a source IP field that is set to the physical IP address of NVD 606; (b) a destination IP field that is set to anycast IP address for VNICaaS system 632. The anycast IP address of VNICaaS system 632 may be obtained as part of configuration from the VCN control plane; (c) a source MPLS label identifying the micro-VNIC 604 associated with compute instance 610; and (d) a destination MPLS label identifying the PE-VNIC as the destination endpoint.

The packet is then communicated to VNICaaS system 632 using a tunneling protocol, where the header added by NVD 606 is used to communicate the packet from NVD 606 to VNICaaS system 632 over a physical network 602.

At VNICaaS system 632, the packet is forwarded to a particular host machine and a particular worker thread executed by the selected VNICaaS host machine then processes the packet as described. The worker thread may determine that the next hop target for the packet is an anycast address associated with the service exposed by the PE-VNIC. The worker thread updates the header information in the packet such that: the source IP address is set to the anycast IP address of VNICaaS 632; the destination substrate IP address is set to an anycast IP address associated with the service; the source label is set to PE-VNIC; and the destination label is set to the PE label. Using the encapsulated header, the packet is forwarded to its destination (e.g., compute instance 1030).

FIGS. 12A-12C depict an example of encapsulation performed for a response packet to be communicated from a service compute instance (e.g., compute instance 1030 in FIG. 10) to a customer's compute instance (e.g., compute instance 610 in FIG. 10) according to certain embodiments. FIG. 12A shows the encapsulation for the response packet communicated from the service endpoint to VNICaaS system 632. The response packet includes an original response packet and a header that is added to the original response packet. The original response packet fields are as follows: Source IP—set to the PE VNIC IP; Destination IP—set to the overly IP address of compute instance 610; Protocol—set to TCP; Source port—set to service port; Destination port—set to client port.

The header that is added to the response packet to enable it to be communicated to VNICaaS system 632 has the following information: Source IP—set to anycast address associated with the service; Destination IP—set to the anycast IP address associated with VNICaaS system 632; Source MPLS label—set to PE (private endpoint) label associated with the service; Destination MPLS label—set to PE VNIC (identifying the service VNIC corresponding to the PE-VNIC).

Once the second packet is received by VNICaaS host 632, processing is performed and it is determined that the response packet is to be forwarded to a physical IP address associated with NVD 606. To facilitate communication of the response packet from VNICaaS system 632 to NVD 606 using a tunneling protocol, the header information in the packet is changed as follows: Source IP—set to anycast address associated with VNICaaS system 632; Destination IP—set to the physical IP address of NVD 606; Source MPLS label—set to PE VNIC; Destination MPLS label—set to micro-VNIC 604 associated with compute instance 610.

The packet is communicated from VNICaaS system 632 to NVD 606 using a tunneling protocol. Upon receiving the response packet, NVD 606 de-capsulates the response packet (i.e., removes the header added to the response packet for tunneling purposes) and forwards the response packet to compute instance 610. FIG. 12C depicts the response packet received by compute instance 610.

FIG. 13 depicts a simplified flowchart 1300 depicting processing performed for communicating a response packet using a VNICaaS system according to certain embodiments. The processing depicted in FIG. 13 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 13 and described below is intended to be illustrative and non-limiting. Although FIG. 13 depicts the various processing steps occurring in a particular sequence or order, this is not intended to be limiting. In certain alternative embodiments, the processing may be performed in some different order or some steps may also be performed in parallel. In the embodiment depicted in FIG. 10, the method depicted in FIG. 13 may be used to communicate a response packet from service compute instance 1030 to compute instance 610.

The processing in FIG. 13 assumes that a packet has previously been communicated from one compute instance to another compute instance using a VNICaaS system. For sake of example, the packet may have been communicated from compute instance 610 to compute instance 1030 depicted in FIG. 10, and a response packet is being sent in response to that previous communication.

At 1305, a response packet is originated at a sender compute instance to be communicated to a destination compute instance. For example, referring to FIG. 10, the sender compute instance may correspond to compute instance 1030 and the destination compute instance may correspond to compute instance 610.

At 1310, the response packet is forwarded from a host machine hosting the sender compute instance to an NVD associated with the host machine. The response packet may be communicated from the host machine using a NIC of the sender host machine.

At 1315, the NVD receiving the response packet may execute a VNIC (e.g., a micro-VNIC) associated with the sender compute instance, which causes the response packet to be communicated from the NVD to VNICaaS system. The packet be sent to an anycast IP address associated with VNICaaS system.

At 1320, the response packet directed to the VNICaaS system is received by top of rack (TOR) switch within the VNICaaS system.

At 1325, the TOR selects a particular VNICaaS host machine to process the response packet from among multiple VNICaaS system host machines. At 1330, a worker thread executed by the host machine selected in 1325 is selected for processing the response packet.

At 1335, the worker thread selected in 1330, based upon information in the received packet determines an IP address to which the response packet is to be sent. The IP address determined may correspond to the physical IP address of the NVD associated with the destination compute instance to which the response packet is to be sent. For example, if the response packet is to be sent to compute instance 610 of FIG. 10, then the determined IP address may correspond to the physical IP address of NVD 606 that is associated with the compute instance 610 i.e., the destination compute instance.

In certain implementations, the worker thread may use information stored in a flow table to determine the IP address in 1335. As described above, when a packet is sent from compute instance 610 to compute instance 1030, the VNICaaS system may store information identifying the traffic flow corresponding to the packet and store state information for the network flow, where the state information includes information identifying the physical IP address of NVD 606, information identifying micro-VNIC 604 associated with compute instance 610, and other information. As part of the processing in 1335, the worker thread may identify a particular network traffic flow corresponding to the response packet, and then consult the flow table for this network traffic flow and access state information for the traffic flow. The state information may identify the physical IP address of NVD 606 and information identifying micro-VNIC 604.

At 1340, the response packet is forwarded from the VNICaaS system to the network device associated with the IP address determined in 1335. For example, in FIG. 10, the response packet may be communicated from VNICaaS system 632 to NVD 606. As part of the processing in 1340, the worker thread encapsulates the response packet, and then a tunneling protocol is used to communicate the encapsulated response packet from the VNICaaS system to the destination NVD.

At 1345, the NVD receives the response packet from the VNICaaS system and then forwards it to the destination compute instance. For example, in FIG. 10, the response packet is forwarded by NVD 606 to compute instance 610. As part of the processing in 1345, NVD 606 may de-capsulate the response packet received from VNICaaS system 632 and then forward it to compute instance 610.

As described above, in certain implementations, multiple service compute instances may sit behind a single virtual IP address, such as the IP address associated with a load balancer fronting the service compute instances. In such situations, in order to ensure that the combination of the source IP address of the response packet and the source port of the response packet uniquely identifies the sending compute instance, VNICaaS system may perform port address translation (PAT) for the source port of the received response packet. For example, VNICaaS system may determine an ephemeral source port for the packet such that the combination of the source IP address and the determined ephemeral source port uniquely identifies the sender of the response packet. The source port of the response packet is changed to the value of the determined ephemeral source port.

Figure 14:
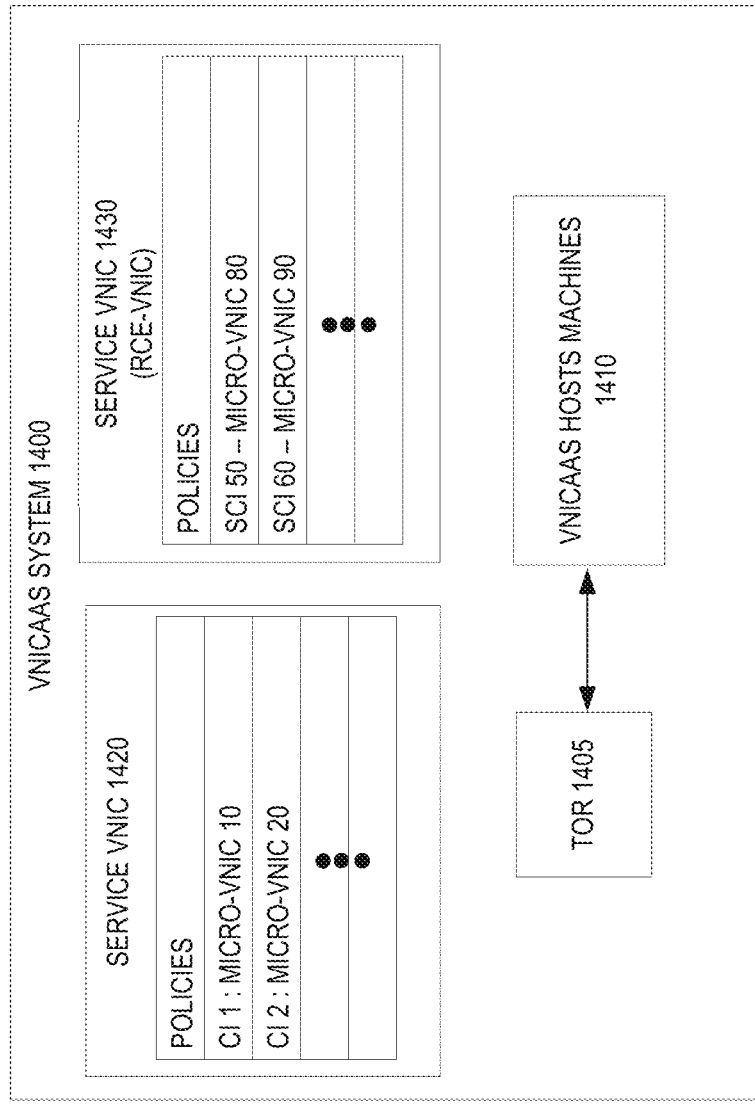
FIG. 14 depicts a diagram of an exemplary VNICaaS system that process network packets between plurality of compute instances within customer's and service's virtual networks, according to at least one embodiment.

FIG. 14 depicts a diagram of an exemplary VNICaaS system. The VNICaaS system 1400 includes a TOR switch 1405, VNICaaS host machines 1410, and two service VNICs 1420 and 1430. It is appreciated that the VNICaaS system 1400 is intended to be illustrative and non-limiting. Specifically, the VNICaaS system 1400 may include more than two service VNICs. According to some embodiments, the VNICaaS system 1400 processes network packets associated with different compute instances e.g., compute instances associated with a customer's virtual network and/or compute instances associated with a service's virtual network.

The TOR switch 1405 is connected to the VNICaaS host machines 1410. The TOR switch 1405 receives packets that are forwarded to the VNICaaS system 1400 for packet processing. TOR switch 1405 is configured to select, from the multiple VNICaaS host machines (that are available for packet processing), a particular host machine for processing the received packet.

The host machine selected by the TOR switch is then responsible for further processing of the packet. Specifically, each host machine comprises compute (e.g., one or multiple processors), storage (e.g., system memory and storage), and networking resources that are available for packet processing performed by the host machine. In certain implementations, a set of multiple processes or threads is configured on each host machine for processing packets received by the host machine. Upon receiving a packet for processing from the TOR switch 1405, a host machine is configured to select an available worker thread, from the set of worker threads configured for that host machine, for processing the packet. In certain implementations, the selected worker thread is configured to examine the received packet (e.g., one or more headers of the packet) and determine a service VNIC for processing the packet.

As shown in FIG. 14, the service VNIC 1420 is selected to process packets originating from two compute instances CI 1 and CI 2. The compute instance CI 1 is associated with micro-VNIC 10 whereas compute instance CI 2 is associated with micro-VNIC 20. It is appreciated that the compute instances CI 1 and CI 2 may belong to the same customer VCN or different customer VCNs. Thus, the same service VNIC i.e., service VNIC 1420 is used to process packets received from different compute instances. Additionally, the packets originating from the compute instances CI 1 and CI 2 may be destined for service compute instances with a service VCN, respectively. For example, the packet originating from compute instance CI 1 may be destined for service compute instance SCI 50, and packets originating from compute instance CI 2 may be destined for service compute instance SCI 60, wherein the service compute instances SCI 50 and SCI 60 may both reside in the service VCN. Additionally, service compute instance SCI 50 may be associated with a micro-VNIC 80, whereas service compute instance SCI 60 may be associated with micro-VNIC 90.

Each of the service compute instances (i.e., SCI 50 and SCI 60) may be configured to generate response packets to be delivered to the respective compute instances residing in the customer side VCN. The responses generated by each of the service compute instances may be directed to the VNICaaS system 1400. As shown in FIG. 14, within the VNICaaS system 1400, service VNIC 1430 is determined to the service VNIC to process the response packets originating from the service compute instances SCI 50 and SCI 60, respectively. The service VNIC 1430 is also referred to herein as a reverse connection endpoint (RCE) service VNIC. It is noted that service VNIC 1430 may be hosted on VNICaaS system 1400 in a similar manner as service VNIC 1420. Additionally, it is appreciated that although the compute instances CI 1 and CI 2 utilized service VNIC 1420 to transmit their respective packets to SCI 50 and SCI 60, the response packets originating from SCI 50 and SCI 60 (and intended for CI 1 and CI 2, respectively) utilized service VNIC 1430. In other words, response packets originating from a destination compute instance (and intended for a source compute instance) may utilize a different service VNIC in the VNICaaS system 1400 than that used by the source compute instance. Furthermore, it is noted that although in the above description, the service compute instances are described as being intended destinations for data packets originating from the compute instances in the customer's VCN, the service compute instances (i.e., SCI 50 and SCI 60) may also act as source compute instances for other data flows.

Figure 15:
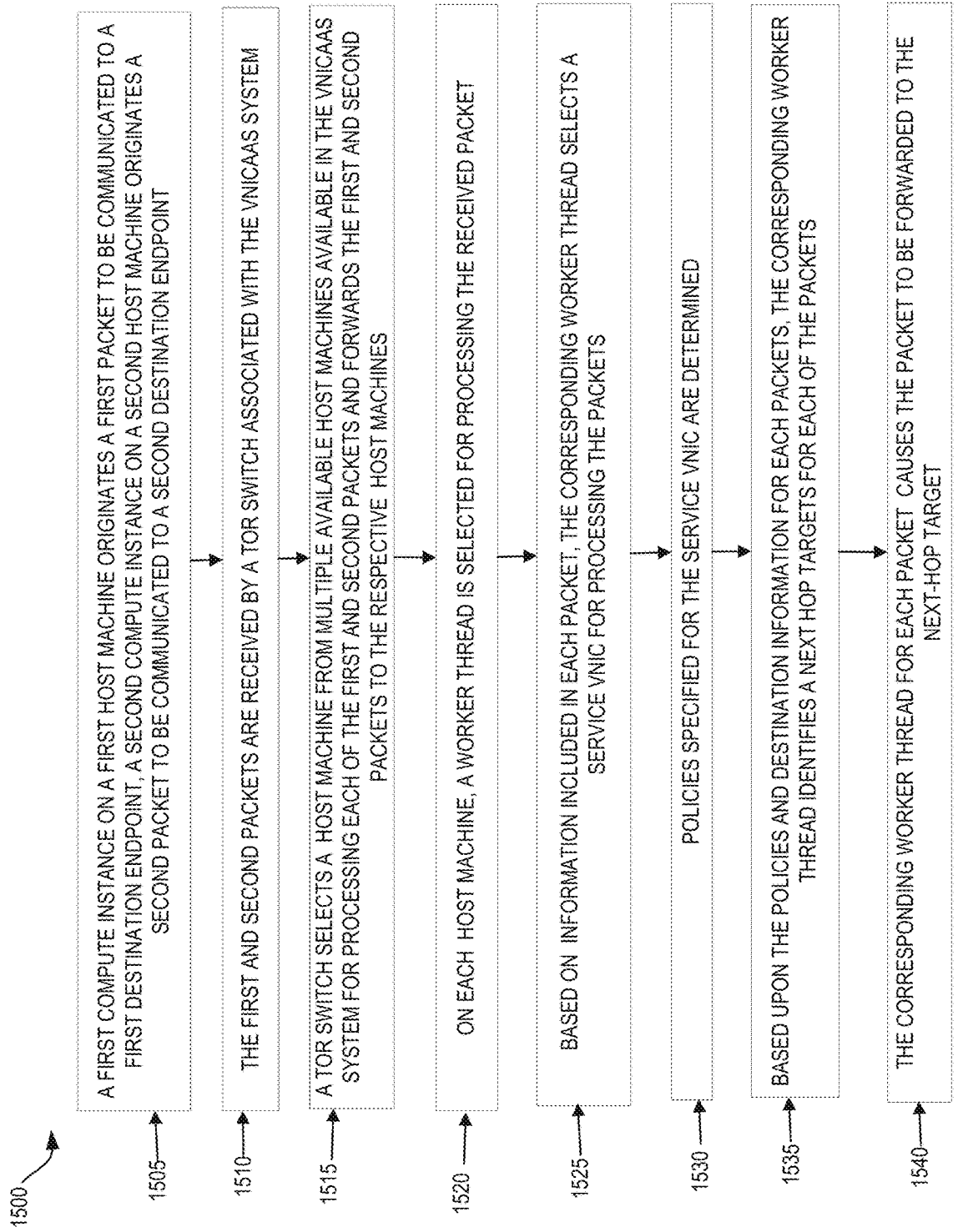
FIG. 15 depicts another simplified flowchart depicting processing of packets using a VNICaaS system according to certain embodiments.

FIG. 15 depicts a simplified flowchart 1500 of processing packets using a VNICaaS system according to certain embodiments. The processing depicted in FIG. 15 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 15 and described below is intended to be illustrative and non-limiting. Although FIG. 15 depicts the various processing steps occurring in a particular sequence or order, this is not intended to be limiting. In certain alternative embodiments, the processing may be performed in some different order or some steps may also be performed in parallel. Specifically, FIG. 15 depicts an example flow diagram of steps performed to process network packets from plurality of compute instances over VNICaaS system, according to at least one embodiment.

In the following description, reference is made to FIG. 7 to refer to the plurality of compute instances. At 1505, a first compute instance (e.g., compute instance 610 in FIG. 7) on a first host machine (e.g., host machine 614) originates a first packet to be communicated to a first destination endpoint. A second compute instance (e.g., compute instance 704) on a second host machine (e.g., host machine 710) originates a second packet to be communicated to a second destination endpoint. The first and second compute instances may be part of a first and a second subnet of a customer VCN.

At 1510, the first and second packets are received by a TOR switch (e.g., TOR switch 616 in FIG. 7) associated with a VNICaaS system.

At 1515, for each of the first packet and the second packet, the TOR switch uses a selection technique to select a particular host machine from multiple available host machines available in the VNICaaS system for processing the packet, and the first and second packets are forwarded to their respectively selected host machines. In certain implementations, the TOR switch analyzes the first and second packets and may use an ECMP technique to select the host machines for processing the packets. The TOR switch may scan the headers of the first and second packets to identify transport protocols and type of packet flows of the packets.

The first and second packets may be processed by the same host machine or by different host machines. For example, in one instance, the same host machine may be selected for processing the first packet and the second packet. In another instance, a first host machine maybe selected for processing the first packet and a second host machine, different from the first host machine, may be selected for processing the second packet.

For each host machine selected for processing the packet, at 1520, a worker thread is selected on the host machine for processing the packet received by that host machine. If the same host machine is selected for processing both the packets, the host machine may evenly distribute processing of packets across a set of worker threads executed by that host machine. For example, a first worker thread may be selected for processing the first packet and a second worker thread may be selected for processing the second packet. In certain implementations, a Receiver-Side Scaling feature (RSS) feature within the host machine may distribute first and second packets evenly between worker threads based on a flow-hash algorithm.

At 1525, for each of the first and second packet, the worker thread selected for processing the packet selects a particular service VNIC for processing the packet. The selection of a service VNIC for a packet may be based upon information contained in the packet. For example, in certain instances, the header information of a packet may identify a source VNIC (i.e., the VNIC associated with the compute instance that sent the packet) for the packet. The worker thread may then determine and select a service VNIC that has been configured as being associated with the source VNIC. In certain instances, the service VNIC may be selected based upon destination information in the header of the packets. For example, if the destination VNIC for a packet is a PE-VNIC or a particular service VNIC, a particular service VNIC associated with the PE-VNIC or service VNIC may be selected for processing the packet.

In certain instances, the same service VNIC may be selected in 1525 for processing both the first packet and the second packets. In other instances, different service VNICs may be selected for processing the first and second packets.

At 1530, for each of the first and the second packet, one or more policies specified for the service VNIC selected in 1525 for processing the packet are determined.

At 1535, for each of the first packet and the second packet, based upon the one or more policies associated with the service VNIC selected for processing the packet and further based upon the destination information for the packet as indicated in the header(s) of the packet, the worker thread processing the packet identifies a next hop target to which the packet is to be sent.

At 1540, for each of the first packet and the second packet, the worker thread processing the packet causes the packet to be forwarded to the next-hop target for the packet determined in 1535. The next-hop targets for the first and second packets may be same or different. The next-hop target to which a packet is sent in 1540 may be the destination of the packet, or a next-hop that facilitates the communication of the packet to its intended final destination endpoint.

The VNICaaS system embodiments described in this disclosure provide for a scalable and highly available distributed infrastructure to process network traffic. According to the teachings described herein, a packet is forwarded to the VNICaaS system, where a service VNIC is selected for processing the packet. Based upon the selected VNIC, the packet is processed and then forwarded to a next hop target to facilitate communication of the packet to its final intended destination. This offloads VNIC-related forwarding functions from the NVDs to the VNICaaS system. The number of host machines in the VNICaaS system can be scaled up or down as desired to meet demand. For example, as the traffic (e.g., the number of packets) communicated between compute instances increases, more host machines can be added to VNICaaS system to provide the requisite compute resources and bandwidth needed for processing the increased volume of traffic without any degradation of performance. Further, since the NVDs now perform less processing, they do not need to possess the same level of resources (e.g., compute. memory, and network resources) as in the past, thereby reducing their costs and the overall cost of the infrastructure.

In certain implementations, the same service VNIC may be associated with multiple micro-VNICs (or regular VNICs) associated with multiple compute instances. These compute instances may execute on the same host machine or different host machines. Further, the compute instances may belong to the same customer VCN or different VCNs. In this manner, the same service VNIC is scaled to process packets received from multiple different compute instances.

On the VNICaaS system, a worker thread on a selected VNICaaS system host machine selects a service VNIC for processing a received packet and then forwards the packet based upon the processing. A first packet received by the VNICaaS system may be forwarded to a first VNICaaS system host machine for processing, where a worker thread on the selected first host machine may select a first service VNIC for processing and forwarding the first packet. A second packet received by the VNICaaS system may be forwarded to a second VNICaaS system host machine (different from the first host machine) for processing, where a worker thread on the selected second host machine may select the same first service VNIC for processing and forwarding the second packet. In this manner, the same VNIC, namely, the first service VNIC is selected for processing two different packets possibly originating from different compute instances. Additionally, different host machines in VNICaaS system may process the same first service VNIC. Accordingly, the same service VNIC can be processed by different host machine in VNICaaS system.

In certain instances, processing performed by the VNICaaS system may determine that there are multiple possible next hop targets for a packet. A single service VNIC may thus identify multiple endpoints and associated next hop targets. In such a situation, the VNICaaS system may select one of the multiple possible next hop targets. In this manner, the VNICaaS system may perform load balancing across the multiple possible next hop targets.

A worker thread on a VNICaaS system host machine may also process multiple service VNICs and process multiple packets from different compute instances. For example, a particular worker thread on a VNICaaS system host machine may be selected for processing a first packet received by the VNICaaS system from a first compute instance. After processing of the first packet by the particular worker thread is completed, the particular worker thread is available for processing other packets received by the VNICaaS system. For example, after processing of the first packet is complete, the particular worker thread may be selected for processing a second packet received by the VNICaaS system from a different compute instance than the first packet. The particular worker thread may select a different service VNIC for processing the second packet. After processing for the second packet is completed, the same particular worker thread may subsequently be selected for processing other packets. In this manner, the same worker thread may process packets from different compute instances using different service VNICs.

In certain implementations, upon receiving a packet, the VNICaaS system performs a hashing operation, wherein at least certain portions of the received packet are hashed in order to identify traffic flow information associated with the packet. By one embodiment, the VNICaaS system stores the traffic flow information (associated with the packet) in a flow table. The traffic flow information comprises state information related to the flow. Such state information is replicated and distributed to all host machines included in the VNICaaS system. Accordingly, for a particular traffic flow, a first packet of the traffic flow may be processed by a first host machine of the VNICaaS system, whereas a second packet of the traffic flow may be processed by a second host machine of the VNICaaS system, which is different than the first host machine. Since the second host machine has access to the state information of the particular traffic flow, the second host machine is capable of processing packets of the particular traffic flow.

In certain implementations, a service VNIC included in the VNICaaS system provides for a load balancing functionality as described below. For example, consider the scenario in which a service VNIC (included in the VNICaaS system) is associated with multiple micro-VNICS. Specifically, multiple micro-VNICS, each of which is associated with a corresponding compute instance, may send data that is processed by the same service VNIC included in the VNICaaS system. In such a scenario, when the service VNIC is selected for processing a packet e.g., from another VNIC, the service VNIC may utilize certain algorithms to determine one of the multiple micro-VNICs to which the data packet is to be forwarded. Once the service VNIC identifies a particular micro VNIC to which the packet is to be forwarded, the service VNIC may implement a selection techniques (such as a flavor of the ECMP algorithm e.g., sticky ECMP) wherein subsequent packets belonging to the packet flow are directed to the same micro-VNIC. In such a manner, the service VNIC may distribute different flows amount different micro-VNICs to achieve a load balancing effect.

Example Cloud Infrastructure Embodiment

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 16:
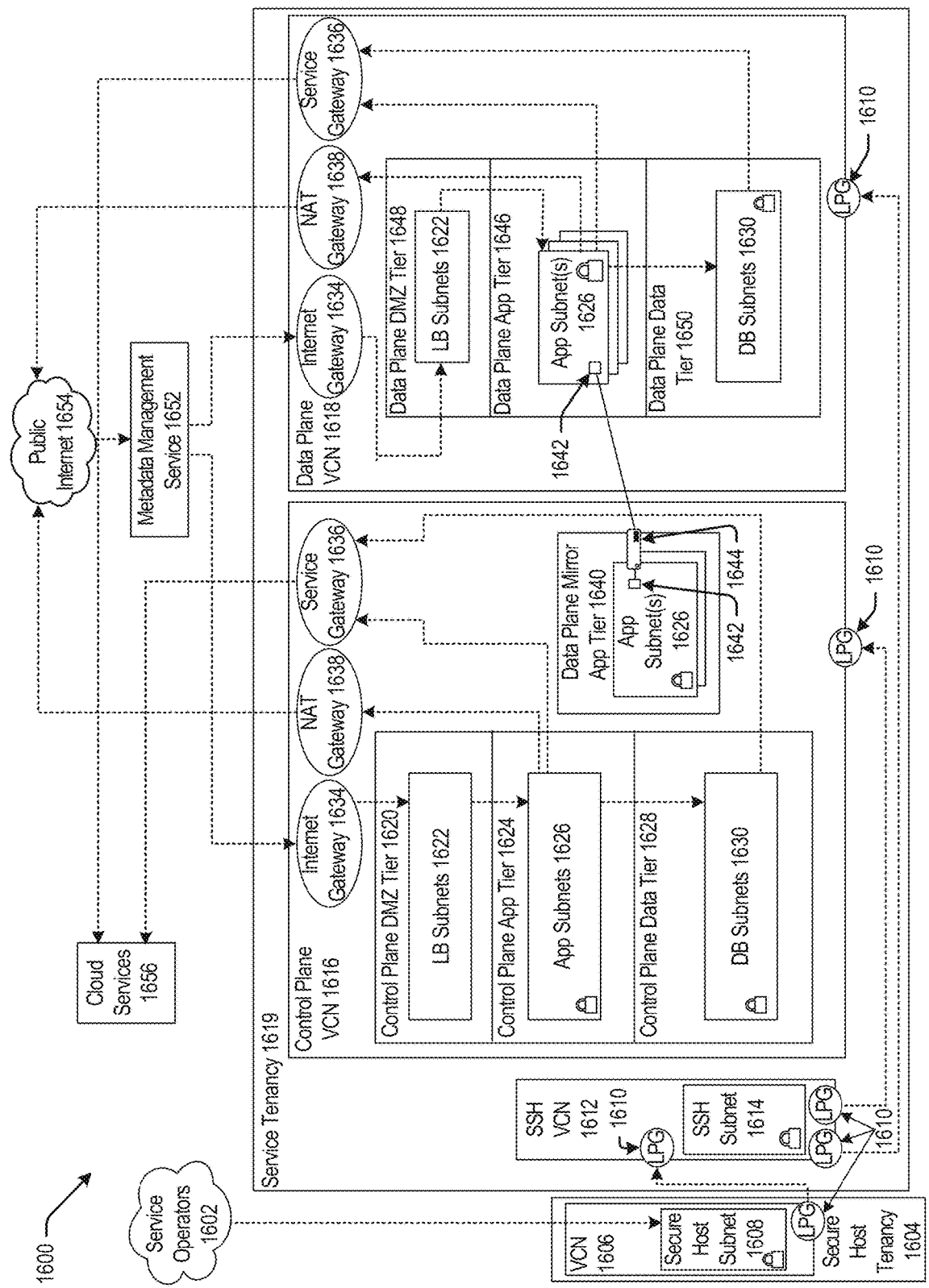
FIG. 16 is a block diagram illustrating one pattern for implementing a cloud infrastructure as a service system, according to at least one embodiment.

FIG. 16 is a block diagram 1600 illustrating an example pattern of an IaaS architecture, according to at least one embodiment. Service operators 1602 can be communicatively coupled to a secure host tenancy 1604 that can include a virtual cloud network (VCN) 1606 and a secure host subnet 1608. In some examples, the service operators 1602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1606 and/or the Internet.

The VCN 1606 can include a local peering gateway (LPG) 1610 that can be communicatively coupled to a secure shell (SSH) VCN 1612 via an LPG 1610 contained in the SSH VCN 1612. The SSH VCN 1612 can include an SSH subnet 1614, and the SSH VCN 1612 can be communicatively coupled to a control plane VCN 1616 via the LPG 1610 contained in the control plane VCN 1616. Also, the SSH VCN 1612 can be communicatively coupled to a data plane VCN 1618 via an LPG 1610. The control plane VCN 1616 and the data plane VCN 1618 can be contained in a service tenancy 1619 that can be owned and/or operated by the IaaS provider.

The control plane VCN 1616 can include a control plane demilitarized zone (DMZ) tier 1620 that acts as a perimeter network (e.g., portions of a corporate network between the corporate intranet and external networks). The DMZ-based servers may have restricted responsibilities and help keep security breaches contained. Additionally, the DMZ tier 1620 can include one or more load balancer (LB) subnet(s) 1622, a control plane app tier 1624 that can include app subnet(s) 1626, a control plane data tier 1628 that can include database (DB) subnet(s) 1630 (e.g., frontend DB subnet(s) and/or backend DB subnet(s)). The LB subnet(s) 1622 contained in the control plane DMZ tier 1620 can be communicatively coupled to the app subnet(s) 1626 contained in the control plane app tier 1624 and an Internet gateway 1634 that can be contained in the control plane VCN 1616, and the app subnet(s) 1626 can be communicatively coupled to the DB subnet(s) 1630 contained in the control plane data tier 1628 and a service gateway 1636 and a network address translation (NAT) gateway 1638. The control plane VCN 1616 can include the service gateway 1636 and the NAT gateway 1638.

The control plane VCN 1616 can include a data plane mirror app tier 1640 that can include app subnet(s) 1626. The app subnet(s) 1626 contained in the data plane mirror app tier 1640 can include a virtual network interface controller (VNIC) 1642 that can execute a compute instance 1644. The compute instance 1644 can communicatively couple the app subnet(s) 1626 of the data plane mirror app tier 1640 to app subnet(s) 1626 that can be contained in a data plane app tier 1646.

The data plane VCN 1618 can include the data plane app tier 1646, a data plane DMZ tier 1648, and a data plane data tier 1650. The data plane DMZ tier 1648 can include LB subnet(s) 1622 that can be communicatively coupled to the app subnet(s) 1626 of the data plane app tier 1646 and the Internet gateway 1634 of the data plane VCN 1618. The app subnet(s) 1626 can be communicatively coupled to the service gateway 1636 of the data plane VCN 1618 and the NAT gateway 1638 of the data plane VCN 1618. The data plane data tier 1650 can also include the DB subnet(s) 1630 that can be communicatively coupled to the app subnet(s) 1626 of the data plane app tier 1646.

The Internet gateway 1634 of the control plane VCN 1616 and of the data plane VCN 1618 can be communicatively coupled to a metadata management service 1652 that can be communicatively coupled to public Internet 1654. Public Internet 1654 can be communicatively coupled to the NAT gateway 1638 of the control plane VCN 1616 and of the data plane VCN 1618. The service gateway 1636 of the control plane VCN 1616 and of the data plane VCN 1618 can be communicatively couple to cloud services 1656.

In some examples, the service gateway 1636 of the control plane VCN 1616 or of the data plane VCN 1618 can make application programming interface (API) calls to cloud services 1656 without going through public Internet 1654. The API calls to cloud services 1656 from the service gateway 1636 can be one-way: the service gateway 1636 can make API calls to cloud services 1656, and cloud services 1656 can send requested data to the service gateway 1636. But, cloud services 1656 may not initiate API calls to the service gateway 1636.

In some examples, the secure host tenancy 1604 can be directly connected to the service tenancy 1619, which may be otherwise isolated. The secure host subnet 1608 can communicate with the SSH subnet 1614 through an LPG 1610 that may enable two-way communication over an otherwise isolated system. Connecting the secure host subnet 1608 to the SSH subnet 1614 may give the secure host subnet 1608 access to other entities within the service tenancy 1619.

The control plane VCN 1616 may allow users of the service tenancy 1619 to set up or otherwise provision desired resources. Desired resources provisioned in the control plane VCN 1616 may be deployed or otherwise used in the data plane VCN 1618. In some examples, the control plane VCN 1616 can be isolated from the data plane VCN 1618, and the data plane mirror app tier 1640 of the control plane VCN 1616 can communicate with the data plane app tier 1646 of the data plane VCN 1618 via VNICs 1642 that can be contained in the data plane mirror app tier 1640 and the data plane app tier 1646.

In some examples, users of the system, or customers, can make requests, for example create, read, update, or delete (CRUD) operations, through public Internet 1654 that can communicate the requests to the metadata management service 1652. The metadata management service 1652 can communicate the request to the control plane VCN 1616 through the Internet gateway 1634. The request can be received by the LB subnet(s) 1622 contained in the control plane DMZ tier 1620. The LB subnet(s) 1622 may determine that the request is valid, and in response to this determination, the LB subnet(s) 1622 can transmit the request to app subnet(s) 1626 contained in the control plane app tier 1624. If the request is validated and requires a call to public Internet 1654, the call to public Internet 1654 may be transmitted to the NAT gateway 1638 that can make the call to public Internet 1654. Memory that may be desired to be stored by the request can be stored in the DB subnet(s) 1630.

In some examples, the data plane mirror app tier 1640 can facilitate direct communication between the control plane VCN 1616 and the data plane VCN 1618. For example, changes, updates, or other suitable modifications to configuration may be desired to be applied to the resources contained in the data plane VCN 1618. Via a VNIC 1642, the control plane VCN 1616 can directly communicate with, and can thereby execute the changes, updates, or other suitable modifications to configuration to, resources contained in the data plane VCN 1618.

In some embodiments, the control plane VCN 1616 and the data plane VCN 1618 can be contained in the service tenancy 1619. In this case, the user, or the customer, of the system may not own or operate either the control plane VCN 1616 or the data plane VCN 1618. Instead, the IaaS provider may own or operate the control plane VCN 1616 and the data plane VCN 1618, both of which may be contained in the service tenancy 1619. This embodiment can enable isolation of networks that may prevent users or customers from interacting with other users', or other customers', resources. Also, this embodiment may allow users or customers of the system to store databases privately without needing to rely on public Internet 1654, which may not have a desired level of security, for storage.

In other embodiments, the LB subnet(s) 1622 contained in the control plane VCN 1616 can be configured to receive a signal from the service gateway 1636. In this embodiment, the control plane VCN 1616 and the data plane VCN 1618 may be configured to be called by a customer of the IaaS provider without calling public Internet 1654. Customers of the IaaS provider may desire this embodiment since database(s) that the customers use may be controlled by the IaaS provider and may be stored on the service tenancy 1619, which may be isolated from public Internet 1654.

Figure 17:
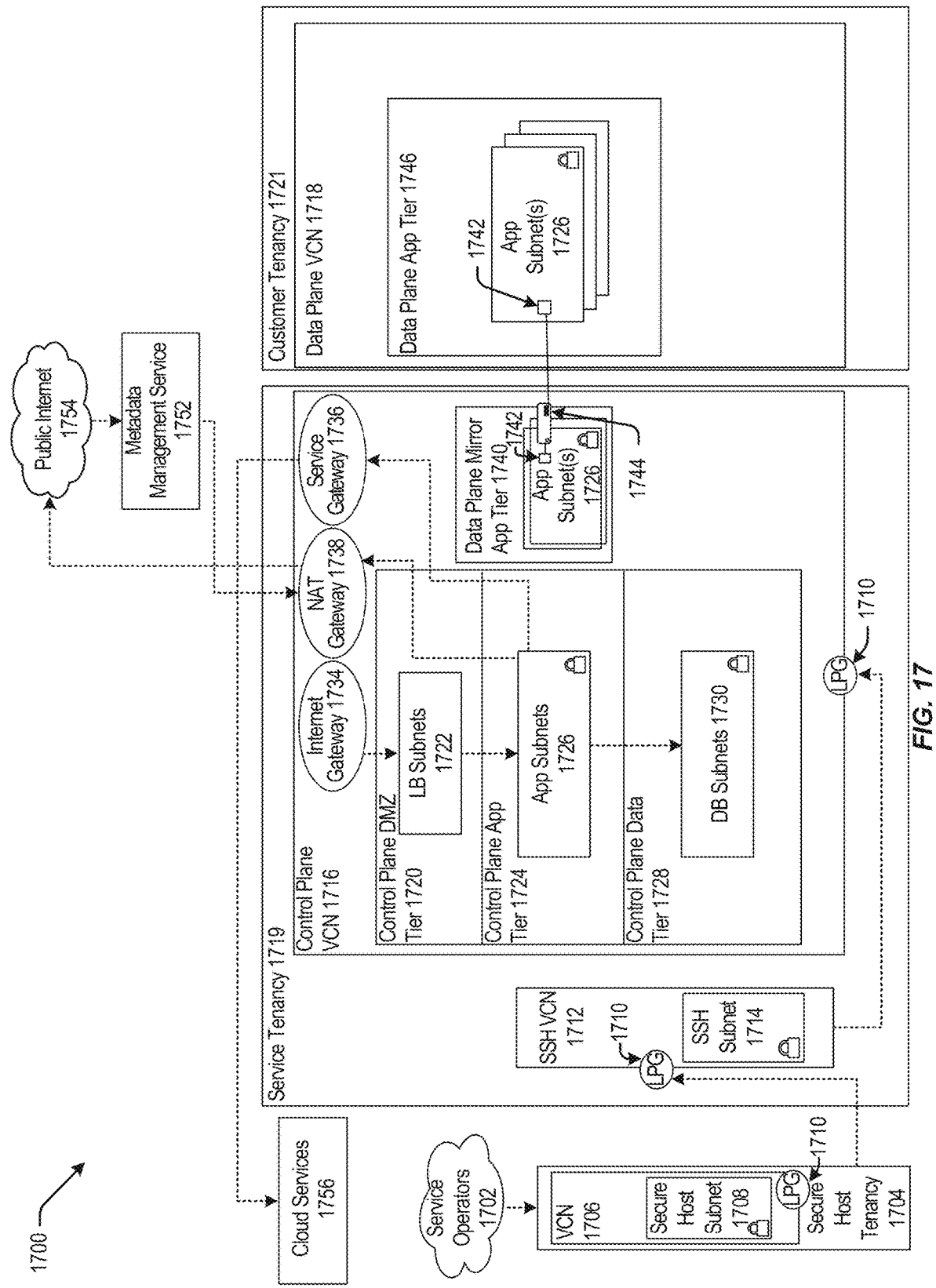
FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g. service operators 1602 of FIG. 16) can be communicatively coupled to a secure host tenancy 1704 (e.g. the secure host tenancy 1604 of FIG. 16) that can include a virtual cloud network (VCN) 1706 (e.g. the VCN 1606 of FIG. 16) and a secure host subnet 1708 (e.g. the secure host subnet 1608 of FIG. 16). The VCN 1706 can include a local peering gateway (LPG) 1710 (e.g. the LPG 1610 of FIG. 16) that can be communicatively coupled to a secure shell (SSH) VCN 1712 (e.g. the SSH VCN 1612 of FIG. 16) via an LPG 1710 contained in the SSH VCN 1712. The SSH VCN 1712 can include an SSH subnet 1714 (e.g. the SSH subnet 1614 of FIG. 16), and the SSH VCN 1712 can be communicatively coupled to a control plane VCN 1716 (e.g. the control plane VCN 1616 of FIG. 16) via an LPG 1710 contained in the control plane VCN 1716. The control plane VCN 1716 can be contained in a service tenancy 1719 (e.g. the service tenancy 1619 of FIG. 16), and the data plane VCN 1718 (e.g. the data plane VCN 1618 of FIG. 16) can be contained in a customer tenancy 1721 that may be owned or operated by users, or customers, of the system.

The control plane VCN 1716 can include a control plane DMZ tier 1720 (e.g. the control plane DMZ tier 1620 of FIG. 16) that can include LB subnet(s) 1722 (e.g. LB subnet(s) 1622 of FIG. 16), a control plane app tier 1724 (e.g. the control plane app tier 1624 of FIG. 16) that can include app subnet(s) 1726 (e.g. app subnet(s) 1626 of FIG. 16), a control plane data tier 1728 (e.g. the control plane data tier 1628 of FIG. 16) that can include database (DB) subnet(s) 1730 (e.g. similar to DB subnet(s) 1630 of FIG. 16). The LB subnet(s) 1722 contained in the control plane DMZ tier 1720 can be communicatively coupled to the app subnet(s) 1726 contained in the control plane app tier 1724 and an Internet gateway 1734 (e.g. the Internet gateway 1634 of FIG. 16) that can be contained in the control plane VCN 1716, and the app subnet(s) 1726 can be communicatively coupled to the DB subnet(s) 1730 contained in the control plane data tier 1728 and a service gateway 1736 (e.g. the service gateway of FIG. 16) and a network address translation (NAT) gateway 1738 (e.g. the NAT gateway 1638 of FIG. 16). The control plane VCN 1716 can include the service gateway 1736 and the NAT gateway 1738.

The control plane VCN 1716 can include a data plane mirror app tier 1740 (e.g. the data plane mirror app tier 1640 of FIG. 16) that can include app subnet(s) 1726. The app subnet(s) 1726 contained in the data plane mirror app tier 1740 can include a virtual network interface controller (VNIC) 1742 (e.g. the VNIC of 1642) that can execute a compute instance 1744 (e.g. similar to the compute instance 1644 of FIG. 16). The compute instance 1744 can facilitate communication between the app subnet(s) 1726 of the data plane mirror app tier 1740 and the app subnet(s) 1726 that can be contained in a data plane app tier 1746 (e.g. the data plane app tier 1646 of FIG. 16) via the VNIC 1742 contained in the data plane mirror app tier 1740 and the VNIC 1742 contained in the data plane app tier 1746.

The Internet gateway 1734 contained in the control plane VCN 1716 can be communicatively coupled to a metadata management service 1752 (e.g. the metadata management service 1652 of FIG. 16) that can be communicatively coupled to public Internet 1754 (e.g. public Internet 1654 of FIG. 16). Public Internet 1754 can be communicatively coupled to the NAT gateway 1738 contained in the control plane VCN 1716. The service gateway 1736 contained in the control plane VCN 1716 can be communicatively couple to cloud services 1756 (e.g. cloud services 1656 of FIG. 16).

In some examples, the data plane VCN 1718 can be contained in the customer tenancy 1721. In this case, the IaaS provider may provide the control plane VCN 1716 for each customer, and the IaaS provider may, for each customer, set up a unique compute instance 1744 that is contained in the service tenancy 1719. Each compute instance 1744 may allow communication between the control plane VCN 1716, contained in the service tenancy 1719, and the data plane VCN 1718 that is contained in the customer tenancy 1721. The compute instance 1744 may allow resources that are provisioned in the control plane VCN 1716 that is contained in the service tenancy 1719, to be deployed or otherwise used in the data plane VCN 1718 that is contained in the customer tenancy 1721.

In other examples, the customer of the IaaS provider may have databases that live in the customer tenancy 1721. In this example, the control plane VCN 1716 can include the data plane mirror app tier 1740 that can include app subnet(s) 1726. The data plane mirror app tier 1740 can reside in the data plane VCN 1718, but the data plane mirror app tier 1740 may not live in the data plane VCN 1718. That is, the data plane mirror app tier 1740 may have access to the customer tenancy 1721, but the data plane mirror app tier 1740 may not exist in the data plane VCN 1718 or be owned or operated by the customer of the IaaS provider. The data plane mirror app tier 1740 may be configured to make calls to the data plane VCN 1718 but may not be configured to make calls to any entity contained in the control plane VCN 1716. The customer may desire to deploy or otherwise use resources in the data plane VCN 1718 that are provisioned in the control plane VCN 1716, and the data plane mirror app tier 1740 can facilitate the desired deployment, or other usage of resources, of the customer.

In some embodiments, the customer of the IaaS provider can apply filters to the data plane VCN 1718. In this embodiment, the customer can determine what the data plane VCN 1718 can access, and the customer may restrict access to public Internet 1754 from the data plane VCN 1718. The IaaS provider may not be able to apply filters or otherwise control access of the data plane VCN 1718 to any outside networks or databases. Applying filters and controls by the customer onto the data plane VCN 1718, contained in the customer tenancy 1721, can help isolate the data plane VCN 1718 from other customers and from public Internet 1754.

In some embodiments, cloud services 1756 can be called by the service gateway 1736 to access services that may not exist on public Internet 1754, on the control plane VCN 1716, or on the data plane VCN 1718. The connection between cloud services 1756 and the control plane VCN 1716 or the data plane VCN 1718 may not be live or continuous. Cloud services 1756 may exist on a different network owned or operated by the IaaS provider. Cloud services 1756 may be configured to receive calls from the service gateway 1736 and may be configured to not receive calls from public Internet 1754. Some cloud services 1756 may be isolated from other cloud services 1756, and the control plane VCN 1716 may be isolated from cloud services 1756 that may not be in the same region as the control plane VCN 1716. For example, the control plane VCN 1716 may be located in "Region 1," and cloud service "Deployment 16," may be located in Region 1 and in "Region 2." If a call to Deployment 16 is made by the service gateway 1736 contained in the control plane VCN 1716 located in Region 1, the call may be transmitted to Deployment 16 in Region 1. In this example, the control plane VCN 1716, or Deployment 16 in Region 1, may not be communicatively coupled to, or otherwise in communication with, Deployment 16 in Region 2.

Figure 18:
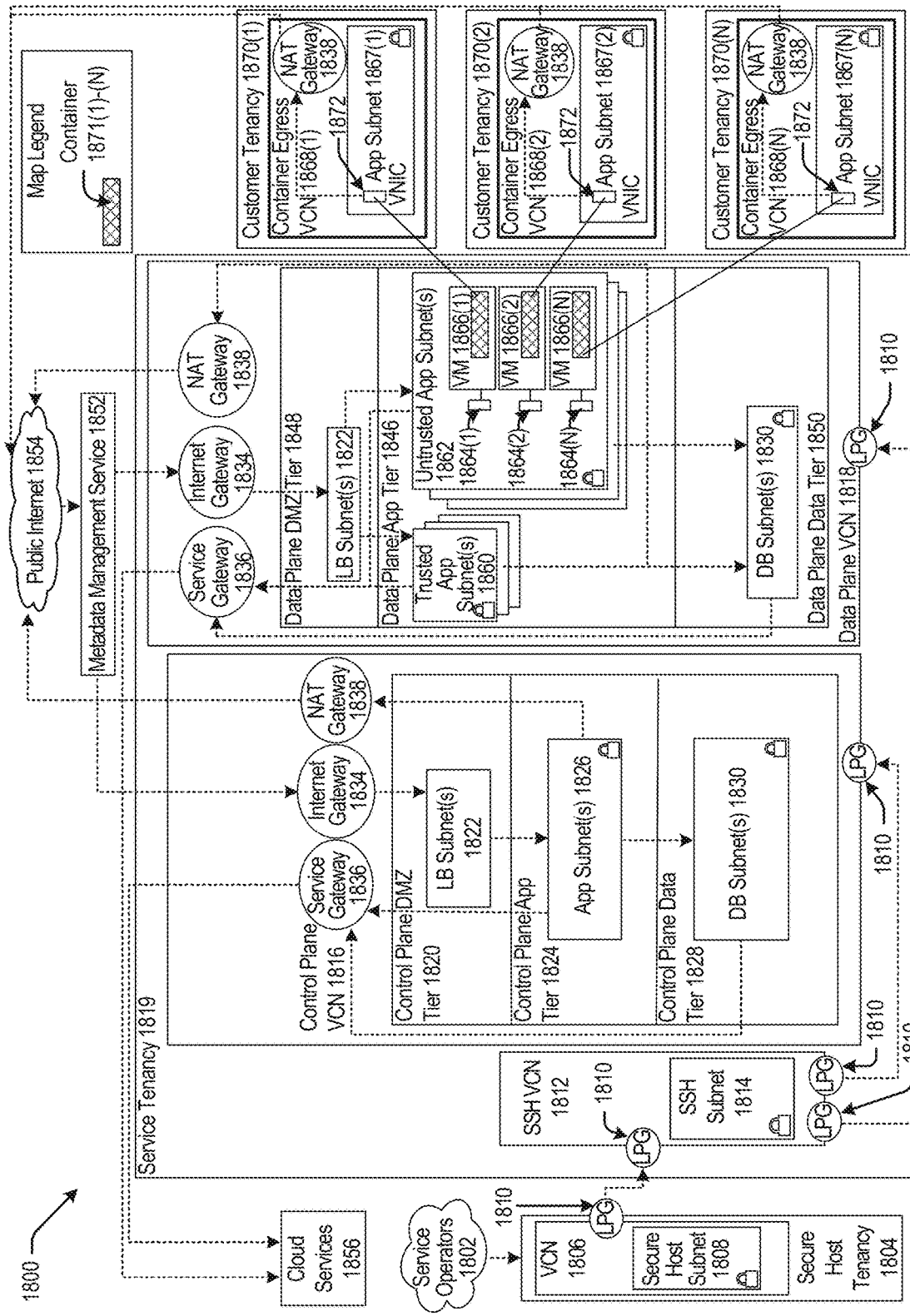
FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g. service operators 1602 of FIG. 16) can be communicatively coupled to a secure host tenancy 1804 (e.g. the secure host tenancy 1604 of FIG. 16) that can include a virtual cloud network (VCN) 1806 (e.g. the VCN 1606 of FIG. 16) and a secure host subnet 1808 (e.g. the secure host subnet 1608 of FIG. 16). The VCN 1806 can include an LPG 1810 (e.g. the LPG 1610 of FIG. 16) that can be communicatively coupled to an SSH VCN 1812 (e.g. the SSH VCN 1612 of FIG. 16) via an LPG 1810 contained in the SSH VCN 1812. The SSH VCN 1812 can include an SSH subnet 1814 (e.g. the SSH subnet 1614 of FIG. 16), and the SSH VCN 1812 can be communicatively coupled to a control plane VCN 1816 (e.g. the control plane VCN 1616 of FIG. 16) via an LPG 1810 contained in the control plane VCN 1816 and to a data plane VCN 1818 (e.g. the data plane 1618 of FIG. 16) via an LPG 1810 contained in the data plane VCN 1818. The control plane VCN 1816 and the data plane VCN 1818 can be contained in a service tenancy 1819 (e.g. the service tenancy 1619 of FIG. 16).

The control plane VCN 1816 can include a control plane DMZ tier 1820 (e.g. the control plane DMZ tier 1620 of FIG. 16) that can include load balancer (LB) subnet(s) 1822 (e.g. LB subnet(s) 1622 of FIG. 16), a control plane app tier 1824 (e.g. the control plane app tier 1624 of FIG. 16) that can include app subnet(s) 1826 (e.g. similar to app subnet(s) 1626 of FIG. 16), a control plane data tier 1828 (e.g. the control plane data tier 1628 of FIG. 16) that can include DB subnet(s) 1830. The LB subnet(s) 1822 contained in the control plane DMZ tier 1820 can be communicatively coupled to the app subnet(s) 1826 contained in the control plane app tier 1824 and to an Internet gateway 1834 (e.g. the Internet gateway 1634 of FIG. 16) that can be contained in the control plane VCN 1816, and the app subnet(s) 1826 can be communicatively coupled to the DB subnet(s) 1830 contained in the control plane data tier 1828 and to a service gateway 1836 (e.g. the service gateway of FIG. 16) and a network address translation (NAT) gateway 1838 (e.g. the NAT gateway 1638 of FIG. 16). The control plane VCN 1816 can include the service gateway 1836 and the NAT gateway 1838.

The data plane VCN 1818 can include a data plane app tier 1846 (e.g. the data plane app tier 1646 of FIG. 16), a data plane DMZ tier 1848 (e.g. the data plane DMZ tier 1648 of FIG. 16), and a data plane data tier 1850 (e.g. the data plane data tier 1650 of FIG. 16). The data plane DMZ tier 1848 can include LB subnet(s) 1822 that can be communicatively coupled to trusted app subnet(s) 1860 and untrusted app subnet(s) 1862 of the data plane app tier 1846 and the Internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s) 1830 that can be communicatively coupled to the service gateway 1836 contained in the data plane VCN 1818.

The untrusted app subnet(s) 1862 can include one or more primary VNICs 1864(1)-(N) that can be communicatively coupled to tenant virtual machines (VMs) 1866(1)-(N). Each tenant VM 1866(1)-(N) can be communicatively coupled to a respective app subnet 1867(1)-(N) that can be contained in respective container egress VCNs 1868(1)-(N) that can be contained in respective customer tenancies 1870(1)-(N). Respective secondary VNICs 1872(1)-(N) can facilitate communication between the untrusted app subnet(s) 1862 contained in the data plane VCN 1818 and the app subnet contained in the container egress VCNs 1868(1)-(N). Each container egress VCNs 1868(1)-(N) can include a NAT gateway 1838 that can be communicatively coupled to public Internet 1854 (e.g. public Internet 1654 of FIG. 16).

The Internet gateway 1834 contained in the control plane VCN 1816 and contained in the data plane VCN 1818 can be communicatively coupled to a metadata management service 1852 (e.g. the metadata management system 1652 of FIG. 16) that can be communicatively coupled to public Internet 1854. Public Internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively couple to cloud services 1856.

In some embodiments, the data plane VCN 1818 can be integrated with customer tenancies 1870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1846. Code to run the function may be executed in the VMs 1866(1)-(N), and the code may not be configured to run anywhere else on the data plane VCN 1818. Each VM 1866(1)-(N) may be connected to one customer tenancy 1870. Respective containers 1871(1)-(N) contained in the VMs 1866(1)-(N) may be configured to run the code. In this case, there can be a dual isolation (e.g., the containers 1871(1)-(N) running code, where the containers 1871(1)-(N) may be contained in at least the VM 1866(1)-(N) that are contained in the untrusted app subnet(s) 1862), which may help prevent incorrect or otherwise undesirable code from damaging the network of the IaaS provider or from damaging a network of a different customer. The containers 1871(1)-(N) may be communicatively coupled to the customer tenancy 1870 and may be configured to transmit or receive data from the customer tenancy 1870. The containers 1871(1)-(N) may not be configured to transmit or receive data from any other entity in the data plane VCN 1818. Upon completion of running the code, the IaaS provider may kill or otherwise dispose of the containers 1871(1)-(N).

In some embodiments, the trusted app subnet(s) 1860 may run code that may be owned or operated by the IaaS provider. In this embodiment, the trusted app subnet(s) 1860 may be communicatively coupled to the DB subnet(s) 1830 and be configured to execute CRUD operations in the DB subnet(s) 1830. The untrusted app subnet(s) 1862 may be communicatively coupled to the DB subnet(s) 1830, but in this embodiment, the untrusted app subnet(s) may be configured to execute read operations in the DB subnet(s) 1830. The containers 1871(1)-(N) that can be contained in the VM 1866(1)-(N) of each customer and that may run code from the customer may not be communicatively coupled with the DB subnet(s) 1830.

In other embodiments, the control plane VCN 1816 and the data plane VCN 1818 may not be directly communicatively coupled. In this embodiment, there may be no direct communication between the control plane VCN 1816 and the data plane VCN 1818. However, communication can occur indirectly through at least one method. An LPG 1810 may be established by the IaaS provider that can facilitate communication between the control plane VCN 1816 and the data plane VCN 1818. In another example, the control plane VCN 1816 or the data plane VCN 1818 can make a call to cloud services 1856 via the service gateway 1836. For example, a call to cloud services 1856 from the control plane VCN 1816 can include a request for a service that can communicate with the data plane VCN 1818.

Figure 19:
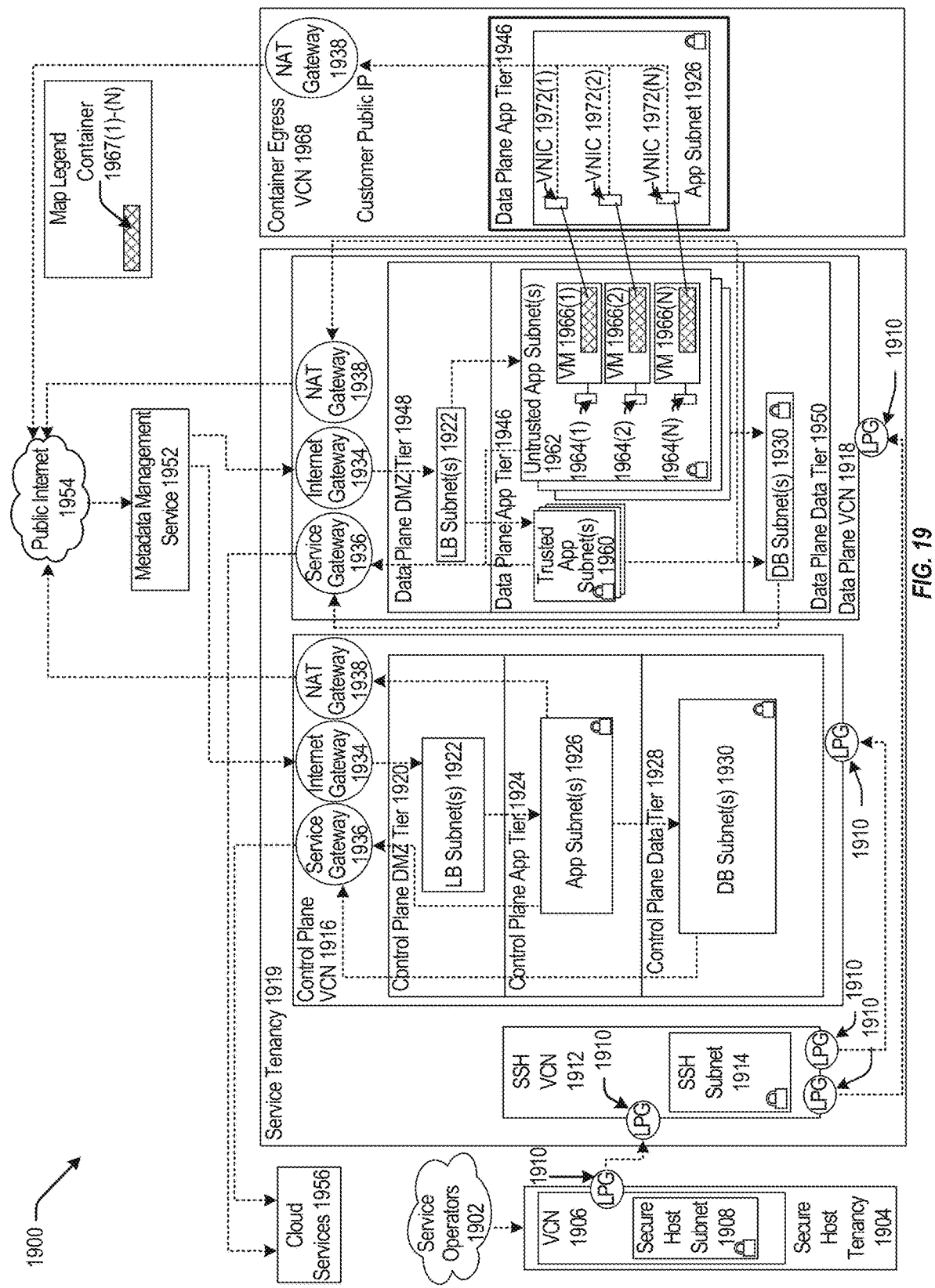
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g. service operators 1602 of FIG. 16) can be communicatively coupled to a secure host tenancy 1904 (e.g. the secure host tenancy 1604 of FIG. 16) that can include a virtual cloud network (VCN) 1906 (e.g. the VCN 1606 of FIG. 16) and a secure host subnet 1908 (e.g. the secure host subnet 1608 of FIG. 16). The VCN 1906 can include an LPG 1910 (e.g. the LPG 1610 of FIG. 16) that can be communicatively coupled to an SSH VCN 1912 (e.g. the SSH VCN 1612 of FIG. 16) via an LPG 1910 contained in the SSH VCN 1912. The SSH VCN 1912 can include an SSH subnet 1914 (e.g. the SSH subnet 1614 of FIG. 16), and the SSH VCN 1912 can be communicatively coupled to a control plane VCN 1916 (e.g. the control plane VCN 1616 of FIG. 16) via an LPG 1910 contained in the control plane VCN 1916 and to a data plane VCN 1918 (e.g. the data plane 1618 of FIG. 16) via an LPG 1910 contained in the data plane VCN 1918. The control plane VCN 1916 and the data plane VCN 1918 can be contained in a service tenancy 1919 (e.g. the service tenancy 1619 of FIG. 16).

The control plane VCN 1916 can include a control plane DMZ tier 1920 (e.g. the control plane DMZ tier 1620 of FIG. 16) that can include LB subnet(s) 1922 (e.g. LB subnet(s) 1622 of FIG. 16), a control plane app tier 1924 (e.g. the control plane app tier 1624 of FIG. 16) that can include app subnet(s) 1926 (e.g. app subnet(s) 1626 of FIG. 16), a control plane data tier 1928 (e.g. the control plane data tier 1628 of FIG. 16) that can include DB subnet(s) 1930 (e.g. DB subnet(s) 1830 of FIG. 18). The LB subnet(s) 1922 contained in the control plane DMZ tier 1920 can be communicatively coupled to the app subnet(s) 1926 contained in the control plane app tier 1924 and to an Internet gateway 1934 (e.g. the Internet gateway 1634 of FIG. 16) that can be contained in the control plane VCN 1916, and the app subnet(s) 1926 can be communicatively coupled to the DB subnet(s) 1930 contained in the control plane data tier 1928 and to a service gateway 1936 (e.g. the service gateway of FIG. 16) and a network address translation (NAT) gateway 1938 (e.g. the NAT gateway 1638 of FIG. 16). The control plane VCN 1916 can include the service gateway 1936 and the NAT gateway 1938.

The data plane VCN 1918 can include a data plane app tier 1946 (e.g. the data plane app tier 1646 of FIG. 16), a data plane DMZ tier 1948 (e.g. the data plane DMZ tier 1648 of FIG. 16), and a data plane data tier 1950 (e.g. the data plane data tier 1650 of FIG. 16). The data plane DMZ tier 1948 can include LB subnet(s) 1922 that can be communicatively coupled to trusted app subnet(s) 1960 (e.g. trusted app subnet(s) 1860 of FIG. 18) and untrusted app subnet(s) 1962 (e.g. untrusted app subnet(s) 1862 of FIG. 18) of the data plane app tier 1946 and the Internet gateway 1934 contained in the data plane VCN 1918. The trusted app subnet(s) 1960 can be communicatively coupled to the service gateway 1936 contained in the data plane VCN 1918, the NAT gateway 1938 contained in the data plane VCN 1918, and DB subnet(s) 1930 contained in the data plane data tier 1950. The untrusted app subnet(s) 1962 can be communicatively coupled to the service gateway 1936 contained in the data plane VCN 1918 and DB subnet(s) 1930 contained in the data plane data tier 1950. The data plane data tier 1950 can include DB subnet(s) 1930 that can be communicatively coupled to the service gateway 1936 contained in the data plane VCN 1918.

The untrusted app subnet(s) 1962 can include primary VNICs 1964(1)-(N) that can be communicatively coupled to tenant virtual machines (VMs) 1966(1)-(N) residing within the untrusted app subnet(s) 1962. Each tenant VM 1966(1)-(N) can run code in a respective container 1967(1)-(N), and be communicatively coupled to an app subnet 1926 that can be contained in a data plane app tier 1946 that can be contained in a container egress VCN 1968. Respective secondary VNICs 1972(1)-(N) can facilitate communication between the untrusted app subnet(s) 1962 contained in the data plane VCN 1918 and the app subnet contained in the container egress VCN 1968. The container egress VCN can include a NAT gateway 1938 that can be communicatively coupled to public Internet 1954 (e.g. public Internet 1654 of FIG. 16).

The Internet gateway 1934 contained in the control plane VCN 1916 and contained in the data plane VCN 1918 can be communicatively coupled to a metadata management service 1952 (e.g. the metadata management system 1652 of FIG. 16) that can be communicatively coupled to public Internet 1954. Public Internet 1954 can be communicatively coupled to the NAT gateway 1938 contained in the control plane VCN 1916 and contained in the data plane VCN 1918. The service gateway 1936 contained in the control plane VCN 1916 and contained in the data plane VCN 1918 can be communicatively couple to cloud services 1956.

In some examples, the pattern illustrated by the architecture of block diagram 1900 of FIG. 19 may be considered an exception to the pattern illustrated by the architecture of block diagram 1800 of FIG. 18 and may be desirable for a customer of the IaaS provider if the IaaS provider cannot directly communicate with the customer (e.g., a disconnected region). The respective containers 1967(1)-(N) that are contained in the VMs 1966(1)-(N) for each customer can be accessed in real-time by the customer. The containers 1967(1)-(N) may be configured to make calls to respective secondary VNICs 1972(1)-(N) contained in app subnet(s) 1926 of the data plane app tier 1946 that can be contained in the container egress VCN 1968. The secondary VNICs 1972(1)-(N) can transmit the calls to the NAT gateway 1938 that may transmit the calls to public Internet 1954. In this example, the containers 1967(1)-(N) that can be accessed in real-time by the customer can be isolated from the control plane VCN 1916 and can be isolated from other entities contained in the data plane VCN 1918. The containers 1967(1)-(N) may also be isolated from resources from other customers.

In other examples, the customer can use the containers 1967(1)-(N) to call cloud services 1956. In this example, the customer may run code in the containers 1967(1)-(N) that requests a service from cloud services 1956. The containers 1967(1)-(N) can transmit this request to the secondary VNICs 1972(1)-(N) that can transmit the request to the NAT gateway that can transmit the request to public Internet 1954. Public Internet 1954 can transmit the request to LB subnet(s) 1922 contained in the control plane VCN 1916 via the Internet gateway 1934. In response to determining the request is valid, the LB subnet(s) can transmit the request to app subnet(s) 1926 that can transmit the request to cloud services 1956 via the service gateway 1936.

It should be appreciated that IaaS architectures 1600, 1700, 1800, 1900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 20:
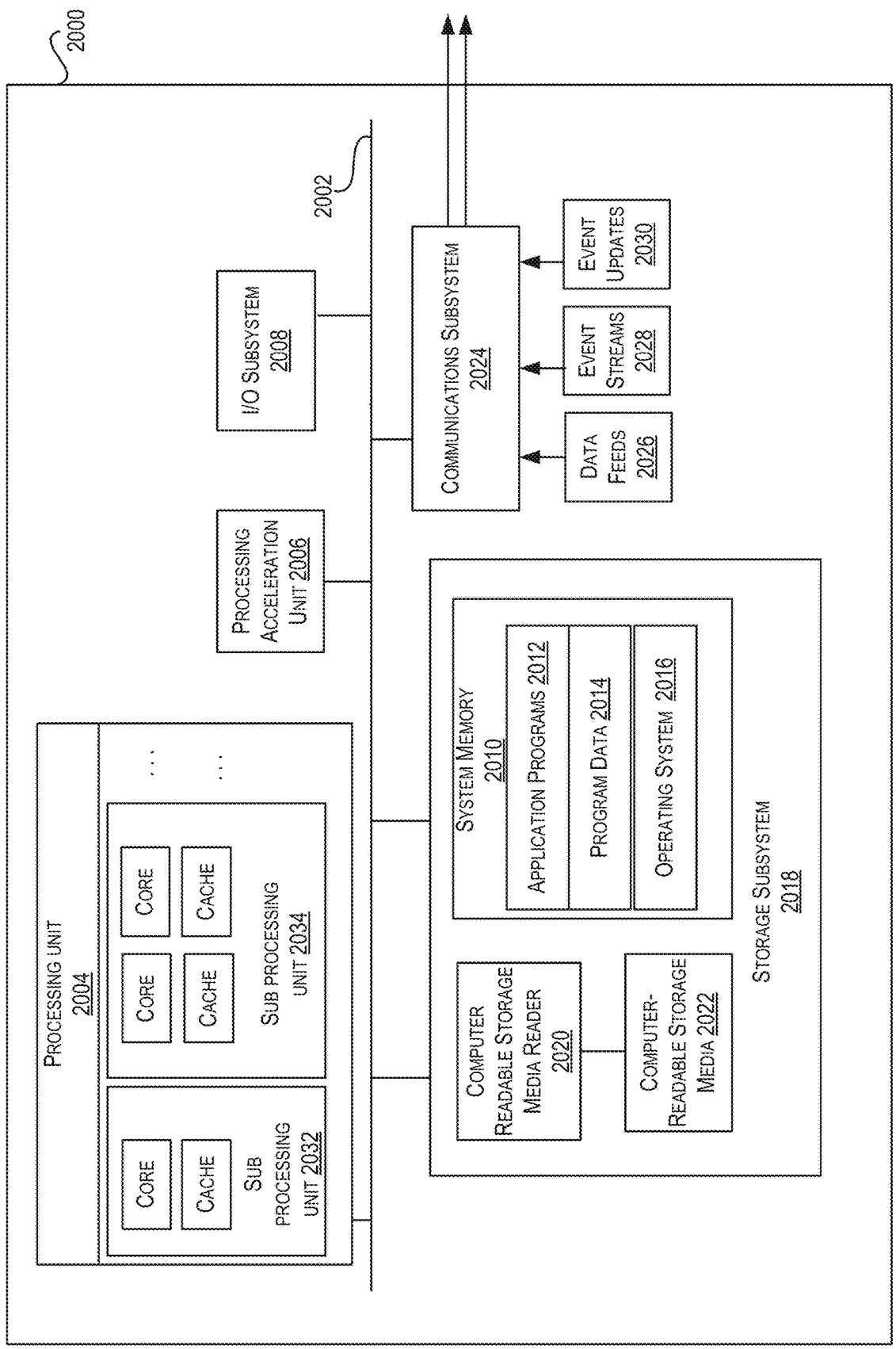
FIG. 20 is a block diagram illustrating an example computer system, according to at least one embodiment.

FIG. 20 illustrates an example computer system 2000, in which various embodiments may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain embodiments, processing unit 2004 may be implemented as one or more independent processing units 2032 and/or 2034 with single or multicore processors included in each processing unit. In other embodiments, processing unit 2004 may also be implemented as a quad-core processing unit formed by integrating two dual-core processors into a single chip.

In various embodiments, processing unit 2004 can execute a variety of programs in response to program code and can maintain multiple concurrently executing programs or processes. At any given time, some or all of the program code to be executed can be resident in processor(s) 2004 and/or in storage subsystem 2018. Through suitable programming, processor(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that comprises software elements, shown as being currently located within a system memory 2010. System memory 2010 may store program instructions that are loadable and executable on processing unit 2004, as well as data generated during the execution of these programs.

Depending on the configuration and type of computer system 2000, system memory 2010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2004. In some implementations, system memory 2010 may include multiple different types of memory, such as static random access memory (SRAM) or dynamic random access memory (DRAM). In some implementations, a basic input/output system (BIOS), containing the basic routines that help to transfer information between elements within computer system 2000, such as during start-up, may typically be stored in the ROM. By way of example, and not limitation, system memory 2010 also illustrates application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 20 OS, and Palm® OS operating systems.

Storage subsystem 2018 may also provide a tangible computer-readable storage medium for storing the basic programming and data constructs that provide the functionality of some embodiments. Software (programs, code modules, instructions) that when executed by a processor provide the functionality described above may be stored in storage subsystem 2018. These software modules or instructions may be executed by processing unit 2004. Storage subsystem 2018 may also provide a repository for storing data used in accordance with the present disclosure.

Storage subsystem 2000 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for temporarily and/or more permanently containing, storing, transmitting, and retrieving computer-readable information.

Computer-readable storage media 2022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2000.

By way of example, computer-readable storage media 2022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some embodiments communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

In some embodiments, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive data feeds 2026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030 that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein. In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed:

1. A method comprising:
receiving, by a first host machine of a packet processing system comprising a plurality of host machines, a first packet originating from a first compute instance hosted by a source host machine that is different from the plurality of host machines, the packet processing system hosting a plurality of virtual network interface cards (VNICs), wherein the first compute instance is part of a first virtual cloud network (VCN);
identifying, by the first host machine and from a plurality of worker threads executed by the first host machine, a first worker thread for processing the first packet;
identifying, by the first worker thread and based upon information included in the first packet, a first VNIC from the plurality of VNICs to be used for processing the first packet;
determining, by the first worker thread and based upon information associated with the first VNIC and destination information included in the first packet, a first next-hop target to which the first packet is to be forwarded; and
causing, by the first worker thread, the first packet to be forwarded to the first next-hop target to be forwarded to a first destination.

2. The method of claim 1, further comprising:
selecting, by the packet processing system, upon receiving the first packet, the first host machine from the plurality of host machines for processing the first packet based on information included in the first packet.

3. The method of claim 2, wherein the packet processing system comprises a top-of-rack (TOR) switch that is connected to each host machine of the plurality of host machines, and wherein the selecting of the first host machine is performed by the TOR switch.

4. The method of claim 1, further comprising:
receiving, by a network virtualization device (NVD) associated with the source host machine, the first packet from the source host machine; and
communicating, by the NVD, the first packet to the packet processing system comprising the plurality of host machines.

5. The method of claim 4, wherein the first packet is received by the NVD from a Network Interface Card (NIC) on the source host machine.

6. The method of claim 4, wherein the NVD comprises a processor, a memory coupled to the processor, and executes a packet processor configured to receive the first packet.

7. The method of claim 4, wherein the communicating comprises:
executing, by the NVD, a first micro-VNIC associated with the first compute instance and the first VNIC; and
causing, by the first micro-VNIC, the first packet to be communicated to the packet processing system.

8. The method of claim 1, wherein the plurality of VNICs are configured to process packets received from different virtual networks.

9. The method of claim 1, wherein a second packet originating from the first compute instance is processed by a second host machine of the plurality of host machines, the second host machine being different than the first host machine.

10. The method of claim 1, wherein the first host machine of the plurality of host machines is identified using an Equal-Cost Multi-Path (ECMP) hash algorithm.

11. The method of claim 3, wherein the first host machine of the plurality of host machines is identified based on the plurality of host machines being advertised via a Border Gateway Protocol (BGP) message.

12. The method of claim 1, wherein the plurality of VNICs are executed simultaneously on a Data Plane Development Kit (DPDK) application hosted on the first host machine.

13. The method of claim 1, wherein the first next-hop target is at least one of a VNIC, a service gateway, Dynamic Routing Gateway (DRG), an Internet Gateway, and a Network Address Translation (NAT) gateway.

14. The method of claim 1, wherein the first worker thread is identified from the plurality of worker threads based on a flow-hash algorithm to transmit the first packet to the first next-hop target.

15. The method of claim 1, wherein the first host machine comprises of at least one of Network Interface Card (NIC), Random Access Memory (RAM), and a central processing unit (CPU).

16. The method of claim 1, further comprising:
validating, by the first host machine, a substrate IP address and an overlay IP address of the first destination retrieved from the first packet prior to forwarding the first packet to the first next-hop target, wherein validating the substrate IP address of the first destination comprises determining whether the substrate IP address is an IP address belonging to one of an availability domain, a region, or an endpoint within a virtual network.

17. The method of claim 1, further comprising:
forwarding, by the first next-hop target, the first packet to the first destination, wherein the first destination of the first packet is a second compute instance hosted on a destination host machine that is different from the plurality of host machines and the source host machine.

18. The method of claim 17, the method further comprising:
receiving, by a second host machine of the plurality of host machines, a second packet originating from the second compute instance, wherein the second compute instance is part of a second VCN, wherein a second destination of the second packet is the first compute instance, wherein the second packet is originated by the second compute instance in response to receiving the first packet;
identifying, by the second host machine and from plurality of worker threads executed by the second host machine, a second worker thread for processing the second packet;
identifying, by the second worker thread and based upon information included in the second packet and information stored within the packet processing system while processing the first packet, a second next-hop target for processing the second packet to be forwarded to the first compute instance; and
causing, by the second worker thread, the second packet to be forwarded to the second next-hop target to be forwarded to the first compute instance.

19. The method of claim 18, wherein the information stored within the packet processing system while processing the first packet includes mapping information for an IP address and port information associated with the first compute instance.

20. A computer system, comprising:
one or more processors; and
a non-transitory computer-readable medium containing instructions which, when executed on the one or more processors, cause the one or more processors to perform operations including:
receiving, by a first host machine of a packet processing system comprising a plurality of host machines, a first packet originating from a first compute instance hosted by a source host machine that is different from the plurality of host machines, the packet processing system hosting a plurality of virtual network interface cards (VNICs), wherein the first compute instance is part of a first virtual cloud network (VCN);
identifying, by the first host machine and from a plurality of worker threads executed by the first host machine, a first worker thread for processing the first packet;
identifying, by the first worker thread and based upon information included in the first packet, a first VNIC from the plurality of VNICs to be used for processing the first packet;
determining, by the first worker thread and based upon information associated with the first VNIC and destination information included in the first packet, a first next-hop target to which the first packet is to be forwarded; and
causing, by the first worker thread, the first packet to be forwarded to the first next-hop target to be forwarded to a first destination.

* * * * *

UNITED STATES PATENT AND TRADEMARK OFFICE
CERTIFICATE OF CORRECTION

Page 1 of 1

PATENT NO. : 11,516,126 B2
APPLICATION NO. : 17/175573
DATED : November 29, 2022
INVENTOR(S) : Tracy et al.

It is certified that error appears in the above-identified patent and that said Letters Patent is hereby corrected as shown below:

In the Drawings

On sheet 2 of 20, in FIG. 2, under Reference Numeral 274, Line 2, delete "INTANCE" and insert -- INSTANCE --, therefor.

On sheet 2 of 20, in FIG. 2, under Reference Numeral 272, Line 2, delete "INTANCE" and insert -- INSTANCE --, therefor.

On sheet 2 of 20, in FIG. 2, under Reference Numeral 270, Line 2, delete "INTANCE" and insert -- INSTANCE --, therefor.

On sheet 2 of 20, in FIG. 2, under Reference Numeral 268, Line 2, delete "INTANCE" and insert -- INSTANCE --, therefor.

In the Specification

In Column 18, Line 48, delete "and or" and insert -- and/or --, therefor.

In Column 52, Line 21, delete "demand)" and insert -- demand)) --, therefor.

Signed and Sealed this
Fifteenth Day of August, 2023

Katherine Kelly Vidal
*Director of the United States Patent and Trademark Office*